(12) United States Patent
Dinica et al.

(10) Patent No.: US 12,209,464 B2
(45) Date of Patent: Jan. 28, 2025

(54) AXIAL, LATERAL AND TORSIONAL FORCE DAMPENER

(71) Applicant: QCD Technology Inc., Calgary (CA)

(72) Inventors: Cornel Dinica, Calgary (CA); Anthony Desmond Russell, Okotoks (CA); Denice Monteil, Calgary (CA); Benjamin Russell, Calgary (CA)

(73) Assignee: QCD Technology Inc., Calgary (CA)

( * ) Notice: Subject to any disclaimer, the term of this patent is extended or adjusted under 35 U.S.C. 154(b) by 604 days.

(21) Appl. No.: 17/115,352

(22) Filed: Dec. 8, 2020

(65) Prior Publication Data

US 2021/0087890 A1 Mar. 25, 2021

Related U.S. Application Data

(63) Continuation-in-part of application No. 14/766,631, filed as application No. PCT/CA2014/000089 on Feb. 6, 2014, now Pat. No. 10,858,895.

(60) Provisional application No. 61/762,737, filed on Feb. 8, 2013.

(51) Int. Cl.
| | |
|---|---|
| *E21B 17/07* | (2006.01) |
| *F16F 1/373* | (2006.01) |
| *F16F 1/40* | (2006.01) |
| *F16F 3/087* | (2006.01) |
| *F16J 15/34* | (2006.01) |
| *F16J 15/36* | (2006.01) |

(52) U.S. Cl.
CPC ............ *E21B 17/07* (2013.01); *F16F 1/3732* (2013.01); *F16F 3/0873* (2013.01); *F16F 3/0876* (2013.01); *F16F 1/40* (2013.01); *F16F 2236/12* (2013.01); *F16J 15/344* (2013.01); *F16J 15/3476* (2013.01); *F16J 15/366* (2013.01)

(58) Field of Classification Search
CPC ... E21B 17/07; F16F 1/40; F16F 1/403; F16F 1/406; B60G 1/38; F16J 15/366; F16J 15/344
USPC .......................................................... 267/294
See application file for complete search history.

(56) References Cited

U.S. PATENT DOCUMENTS

| | | |
|---|---|---|
| 2,822,050 A | 2/1958 | Conrad |
| 2,897,016 A | 7/1959 | Baker |
| 3,306,078 A | 2/1967 | Hughes |

(Continued)

FOREIGN PATENT DOCUMENTS

WO   2014022768 A   2/2014

*Primary Examiner* — Robert E Fuller
*Assistant Examiner* — Neel Girish Patel
(74) *Attorney, Agent, or Firm* — Farber LLC

(57) ABSTRACT

A downhole tool for dampening vibrational, lateral, compressive, and tensile forces exerted on sensor equipment inside a drillstring is described. The downhole tool is housed inside the drill string. The tool generally includes a bottom end shaft for connection to the drillstring and that is telescopically engaged within a compression housing and a torsional housing. The torsional housing enables the bottom end shaft to slide axially with respect to the torsional housing whilst preventing torsional movement of the bottom end shaft relative to the torsional housing. The compression housing is connected to the sensor equipment and operatively contains a first spring between the compression housing and the bottom end shaft that absorbs compression forces between bottom end shaft and compression housing.

5 Claims, 29 Drawing Sheets

(56) References Cited

U.S. PATENT DOCUMENTS

| | | |
|---|---|---|
| 3,406,537 A | 10/1968 | Falkner, Jr. |
| 3,581,834 A | 6/1971 | Kellner et al. |
| 3,871,193 A | 3/1975 | Young |
| 4,133,516 A * | 1/1979 | Jurgens .................. E21B 17/07 175/321 |
| 4,194,582 A * | 3/1980 | Ostertag ................. E21B 17/07 267/71 |
| 4,257,245 A | 3/1981 | Toelke et al. |
| 4,281,726 A * | 8/1981 | Garrett .................. E21B 17/07 175/321 |
| 4,434,863 A | 3/1984 | Garrett |
| 4,844,157 A * | 7/1989 | Taylor .................... E21B 17/07 166/178 |
| 4,997,037 A | 3/1991 | Coston |
| 5,048,611 A * | 9/1991 | Cochran ............... E21B 34/142 166/321 |
| 5,083,623 A | 1/1992 | Barrington |
| 5,251,914 A | 10/1993 | Tatum |
| 5,964,307 A * | 10/1999 | Wenzel .................. E21B 17/07 175/321 |
| 6,062,905 A | 5/2000 | Sampa et al. |
| 6,269,878 B1 | 8/2001 | Wyatt et al. |
| 8,205,691 B2 | 6/2012 | Bowar et al. |
| 10,407,999 B2 | 9/2019 | Pratt et al. |
| 10,683,710 B2 * | 6/2020 | Christopher .......... E21B 17/028 |
| 10,982,492 B1 * | 4/2021 | Gopalan ................. E21B 17/07 |
| 2002/0050361 A1 | 5/2002 | Shaw et al. |
| 2002/0185312 A1 | 12/2002 | Armell et al. |
| 2003/0089497 A1 | 5/2003 | George et al. |
| 2003/0102164 A1 | 6/2003 | Odell, II et al. |
| 2005/0279565 A1 | 12/2005 | Arian et al. |
| 2009/0023502 A1 | 1/2009 | Koger |
| 2009/0173541 A1 | 7/2009 | Tulloch et al. |
| 2010/0181111 A1* | 7/2010 | Bowar .................... E21B 17/07 175/56 |
| 2011/0198126 A1 | 8/2011 | Swietlik et al. |
| 2012/0152518 A1 | 6/2012 | Johanning et al. |
| 2012/0211251 A1 | 8/2012 | Konschuh et al. |
| 2012/0228028 A1 | 9/2012 | Turner et al. |
| 2012/0247832 A1 | 10/2012 | Cramer et al. |
| 2015/0376959 A1* | 12/2015 | Dinica ................... E21B 17/07 175/56 |
| 2017/0328142 A1 | 11/2017 | Pratt et al. |
| 2019/0338631 A1* | 11/2019 | Brown ................. E21B 47/024 |

* cited by examiner

TOOL IN FULL COMPRESSION

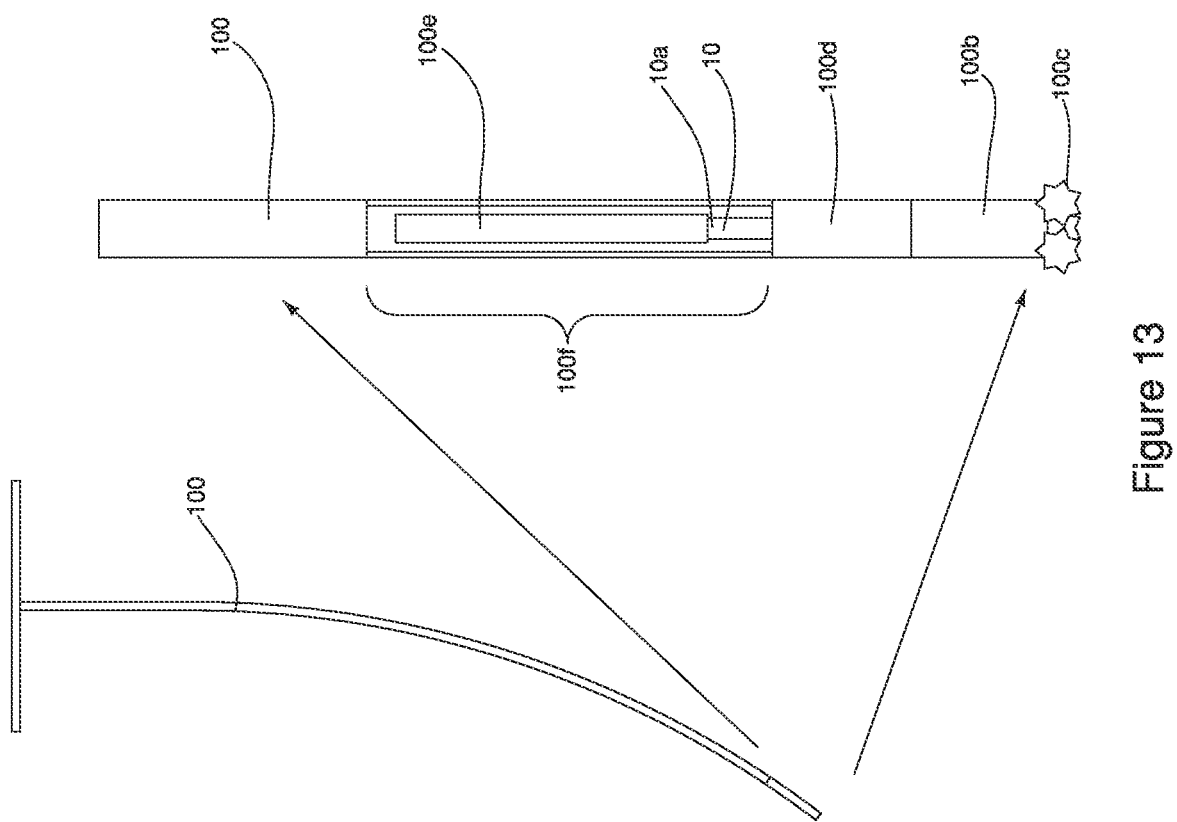

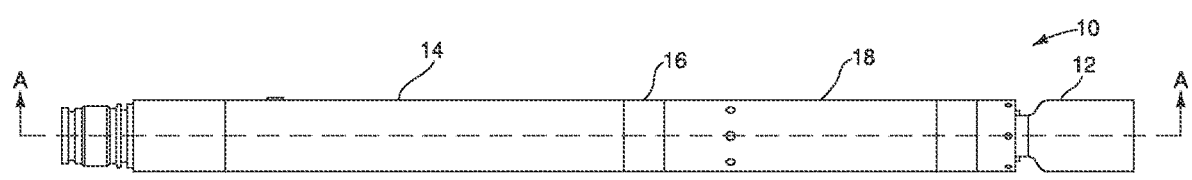
Figure 15
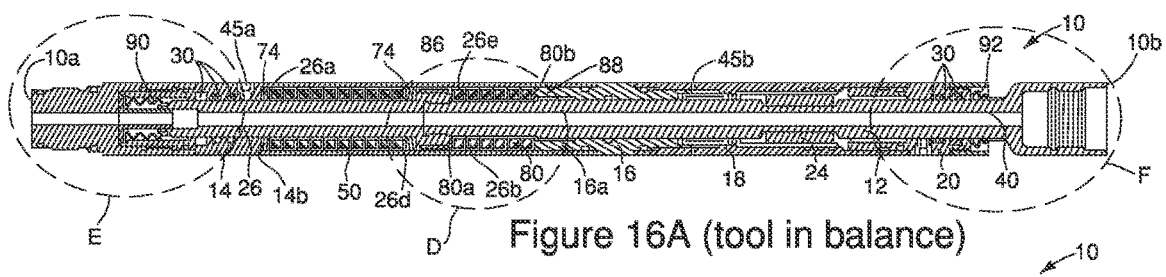
Figure 16A (tool in balance)
Figure 16B (tool compressed)
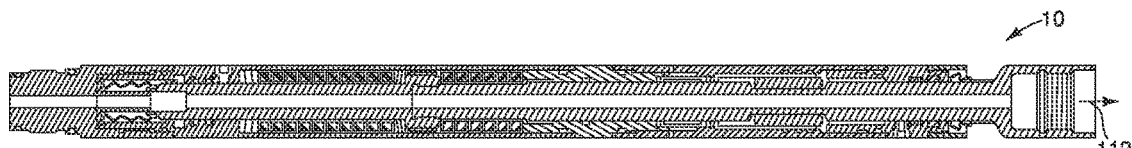
Figure 16C (tool extended)

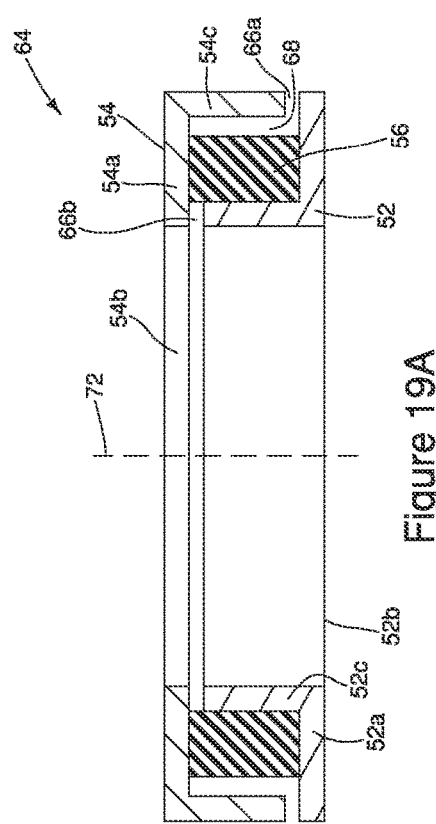
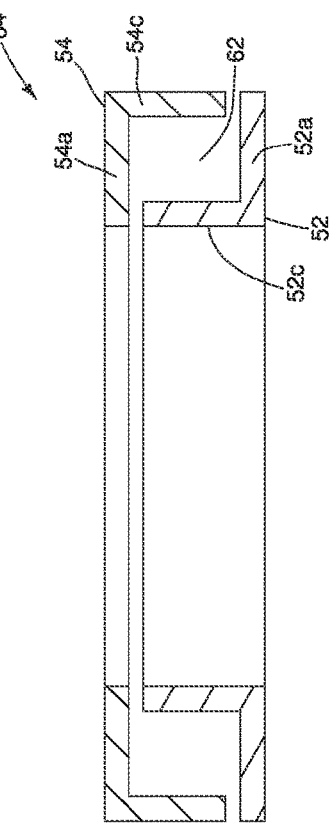
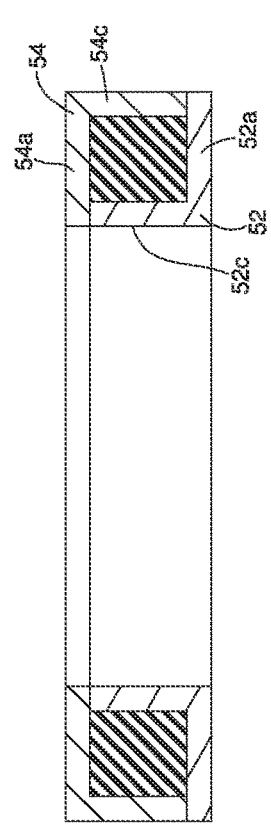
Figure 19A
Figure 19B
Figure 19C

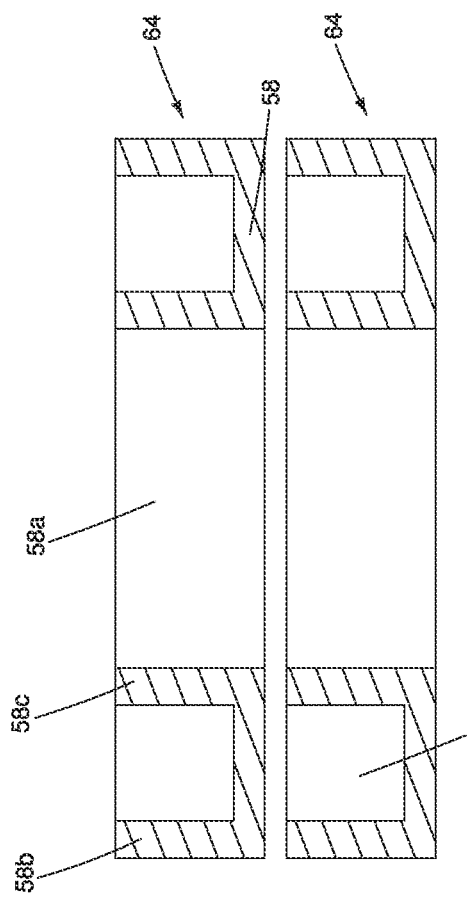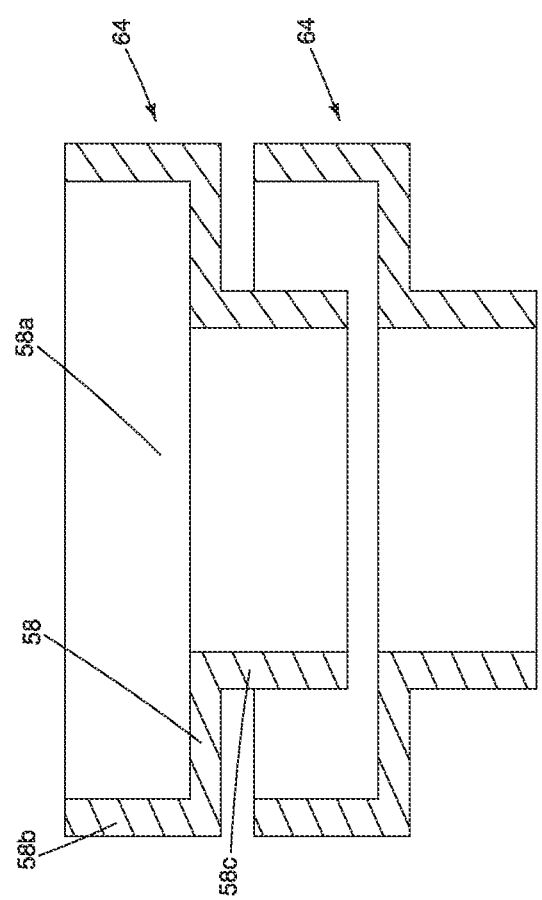

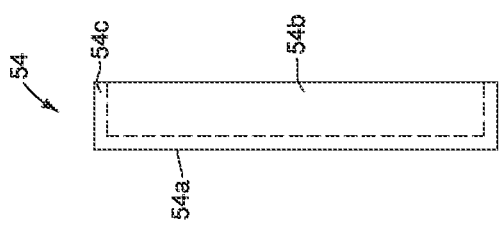
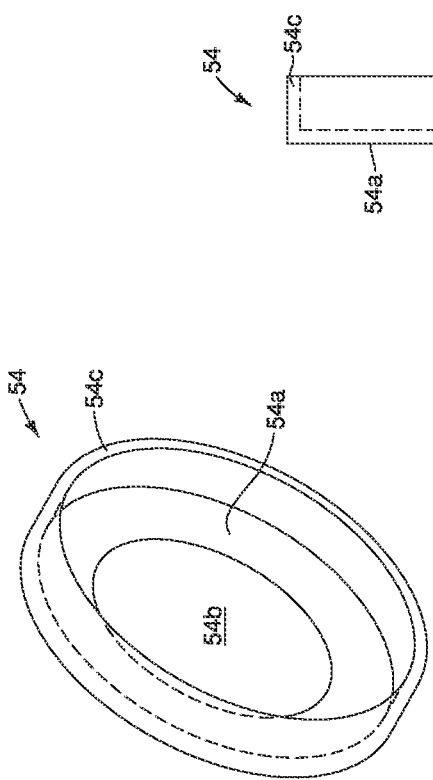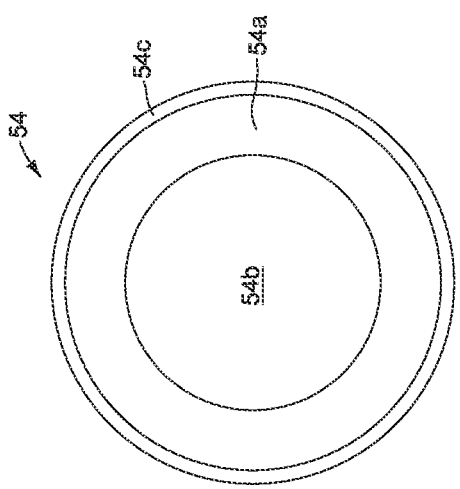

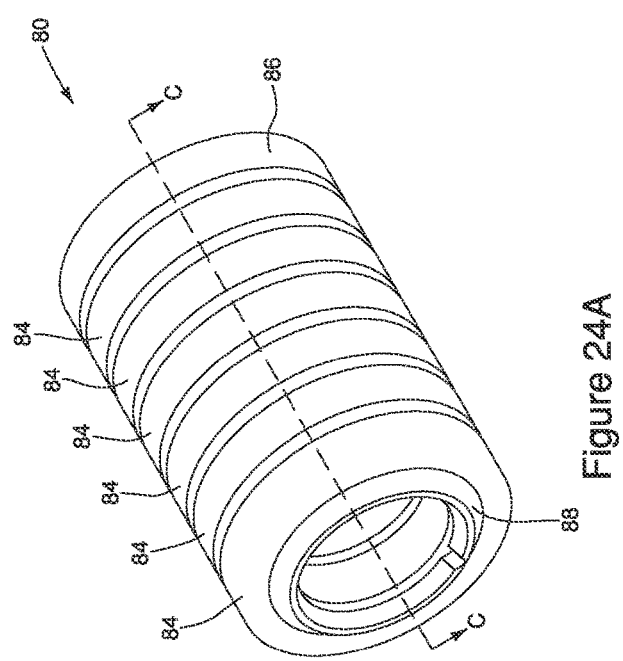
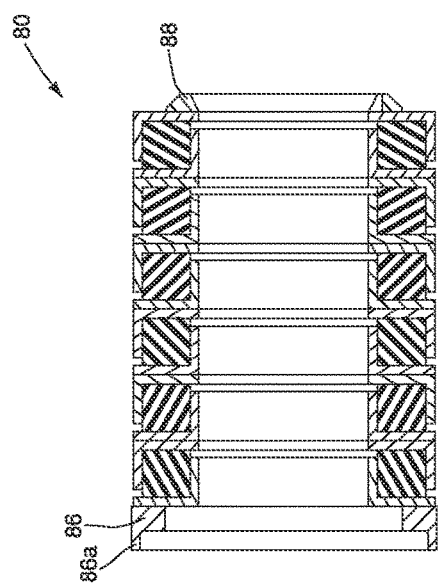

AXIAL, LATERAL AND TORSIONAL FORCE DAMPENER

FIELD OF THE INVENTION

The invention relates to systems for dampening axial, lateral and torsional forces to probe-based sensors inside a drillstring.

BACKGROUND OF THE INVENTION

In the oil and gas industry and in particular during directional drilling, measurement while drilling (MWD), logging while drilling (LWD) and logging while tripping (LWT) procedures, there is a need to protect downhole equipment from the high shock downhole environment during these drilling procedures. In particular, during these procedures, as sensitive downhole equipment may be housed inside the drill string, there is a need to protect the equipment from the severe torsional, axial and lateral vibrations and shock experienced by the equipment as the drillstring is moved up and down and rotated within the well.

As is known, such equipment may include electronic devices that include various sensors and on-board electronics that are designed to obtain and collect data from the well. Generally, such devices are engineered to withstand particular stress loadings; however, as with all equipment there are limits as to what the equipment can withstand.

For example, in the particular case of techniques such as MWD and horizontal drilling, such techniques often require and/or utilize drillstring agitation devices that are activated to enable desired rates of penetration (ROP). As such, measurement equipment may be more susceptible to damage due to increased shock and vibrational loads.

Moreover, in the particular case of horizontal drilling, severe torsional stresses can be imposed on a drill string as a result of the friction of a long section of stationary drill pipe lying against a lower surface of a well. That is, during drilling of deviated sections, a drill string may "wound up" as rotation of the drill string commences and the frictional forces of the drill string against the well have to be overcome before rotation of the drill string occurs. In these cases, there can be a violent release of torsional energy at the moment these frictional forces are overcome that can impart severe stresses on any sensors located within the drill string.

As a result, the severe forces being applied to the various pieces of equipment can often result in early or unexpected failures of equipment. Moreover, as drilling technologies and methodologies evolve, equipment may be subjected to greater forces.

As is well known, equipment failures are expensive to operators both from a time and cost perspective.

In the past, various technologies have been developed to address these problems and while some of these past technologies have been at least partially effective in addressing some of the above issues, there continues to be a need for technologies that are effective in providing a unified solution to dampening axial, lateral and torsional forces while also enabling throughbore pressures to be maintained within the drillstring, and maintain alignment integrity.

For example, various collar based solutions have been provided in the past that are part of the drill string itself, i.e. are an integral, load bearing part of the outside of the drill string. However, collar based systems often add 2.5 m to the overall length of the sensing package, are difficult to service, and can be difficult to achieve compatibility with existing equipment. As well, certain variations of collar based systems absorb energy in the collars, which degrades ROP. Also, this technology has been known to interfere with the drilling dynamics.

Other force dampening systems include the use of snubbers. Snubbers are sets of pins that are attached to printed circuit board (PCB) carriers, which are then encapsulated in rubber. The rubber is then is encapsulated in a metal shell that is attached to a housing that the PCB carrier is contained in. As such, snubbers are designed to isolate the PCB boards from the shock and vibration experienced by the PCB housing. However, while snubbers are at least partially effective, as drilling shock and vibration loads are generally increasing within the industry, snubbers are destroyed more quickly.

A review of the prior art reveals that various tools to have been developed in the past. Examples of these tools include those described in Patent References US 2012/0228028, US 2012/0152518, US 2012/0247832, US 2009/0023502, US 2011/0198126, U.S. Pat. Nos. 3,406,537, 3,306,078 and 5,083,623.

In view of the above, there has been a need for improved anti-vibrational tools that provide anti-rotational properties and throughbore pressure integrity. In addition, there has been a need for improved anti-vibrational tools capable of withstanding 150-175 g loads and that have improved assembly and maintenance properties in a compact design.

SUMMARY OF THE INVENTION

In accordance with the invention, there is provided a downhole tool for connection to a drill string for dampening forces on shock-sensitive equipment inside the drill string.

In some embodiments, the downhole tool comprises a compression housing for operative connection to the equipment; a torsional housing operatively connected to the compression housing for dampening torsional forces on the equipment, a sliding shaft for operative connection to the drill string, the sliding shaft telescopically movable inside the compression housing and the torsional housing; a first spring assembly operatively contained between the compression housing and the sliding shaft for dampening compression forces between the sliding shaft and the compression housing, the first spring assembly for dampening compression forces transmitted to the equipment; wherein the torsional housing has at least one longitudinal slot operatively containing at least one pin which is engaged in a recess on the sliding shaft to allow axial movement and limit rotational movement of the sliding shaft relative to the torsional housing; and wherein in operation, the downhole tool and the equipment are housed inside the drill string.

The first spring assembly of the downhole tool may comprise at least one spring member having at least two annular discs forming a channel for retaining an elastomeric member that dampens axial forces when compressed. The first spring assembly may further include at least one disc spring.

In some embodiments, the downhole tool further comprises a second spring assembly operatively contained between the compression housing and the sliding shaft for dampening compression and/or tension forces between the sliding shaft and the compression housing.

In some embodiments, the second spring assembly comprises at least one spring member having at least two annular discs forming a channel for retaining an elastomeric member that dampens axial forces when compressed.

In some embodiments, the torsional housing includes a rubber sleeve configured to inner surfaces of the torsional housing for providing torsional force dampening, wherein the at least one pin engages with the rubber sleeve. The torsional housing may operatively retain four pins.

In some embodiments, the first and second spring assemblies are contained within first and second hydraulic chambers containing hydraulic fluid to provide further dampening, the hydraulic fluid sealed within the chambers from drilling fluid located in a throughbore of the tool.

In some embodiments, the downhole tool further comprises a first seal between the torsional housing and sliding shaft, and a second seal between the compression housing and sliding shaft.

In some embodiments, the downhole tool further comprises a first bellows adjacent the first seal and a second bellows adjacent the second seal.

The downhole tool may further comprise a pressure compensation system for equalizing pressure between the exterior of the tool and the first and second seals.

In some embodiments, the pressure compensation system includes a pressure ring operatively positioned between the first and second seals having an internal diameter generally corresponding to the external diameter of the sliding shaft, the pressure ring having at least one hole extending between an internal and external surface of the pressure ring, where in the external surface operatively retains a pressure ring seal.

In some embodiments, the torsional housing comprises an outer torsion housing and an inner torsion cartridge having mating splines and recesses enabling helical and axial movement of the inner torsion cartridge relative to the outer torsion housing when the inner torsion cartridge is subjected to a torsional force relative to the outer torsion housing; the inner torsion cartridge comprising the at least one longitudinal slot operatively containing the at least one pin.

In some embodiments, the downhole tool as in claim further comprises a disc spring seated against downhole and uphole surfaces of the inner torsion cartridge for absorbing axial uphole and downhole forces when the inner torsion cartridge moves relative to the outer torsion housing.

In some embodiments, the first spring assembly comprises one or more spring members, each spring member comprising an elastomeric ring biased in a resting position and elastically deformable to a compressed position; a first annular disc having a top surface and a hole in the center; second annular disc having a bottom surface and a hole in the center; an inner wall extending around an inner perimeter of the first or second annular disc; and an outer wall extending around an outer perimeter of the first or second annular disc; wherein the top surface of the first annular disc faces the bottom surface of the second annular disc to align the holes of each annular disc and form a channel between the annular discs, and the elastomeric ring is disposed in the channel; wherein the spring member is movable between: a neutral position in which the first and second annular discs are spaced apart such that the inner and outer walls do not contact the annular disc that they are facing; and a compressed position in which the inner and outer walls abut the annular disc that they are facing; wherein movement from the neutral position to the compressed position causes the elastomeric ring to deform to provide force dampening.

In some embodiments, there is provided a downhole tool for connection to a drill string for dampening forces on shock-sensitive equipment inside the drill string, the downhole tool comprising: a compression housing for operative connection to the equipment; a torsional housing operatively connected to the compression housing for dampening torsional forces on the equipment, the torsional housing including an outer torsion housing and an inner torsion cartridge that can move axially with respect to one another, a sliding shaft for operative connection to the drill string, the sliding shaft telescopically movable inside the compression housing and the torsional housing; a first spring assembly contained inside a first hydraulic chamber containing hydraulic fluid between the compression housing and the sliding shaft for dampening axial forces between the sliding shaft and the compression housing; a second spring assembly operatively contained inside a second hydraulic chamber containing hydraulic fluid between the compression housing and the sliding shaft for dampening axial forces between the sliding shaft and the compression housing; wherein the inner torsion cartridge has at least one longitudinal slot operatively containing at least one pin which is engaged in a recess on the sliding shaft to allow axial movement and limit rotational movement of the sliding shaft relative to the torsional housing; wherein in operation, the downhole tool and the equipment are housed inside the drill string.

In another aspect of the invention, there is provided a spring member for dampening axial forces comprising an elastomeric ring biased in a resting position and elastically deformable to a compressed position; a first annular disc having a top surface and a hole in the center; second annular disc having a bottom surface and a hole in the center; an inner wall extending around an inner perimeter of the first or second annular disc; and an outer wall extending around an outer perimeter of the first or second annular disc; wherein the top surface of the first annular disc faces the bottom surface of the second annular disc to align the holes of each annular disc and form a channel between the annular discs, and the elastomeric ring is disposed in the channel, wherein the spring member is movable between: a neutral position in which the first and second annular discs are spaced apart such that the inner and outer walls do not contact the annular disc that they are facing; and a compressed position in which the inner and outer walls abut the annular disc that they are facing; and movement from the neutral position to the compressed position causes the elastomeric ring to deform to provide force dampening.

In some embodiments of the spring member, the inner wall extends from the first annular disc top surface; and the outer wall extends from the second annular disc bottom surface.

There is also provided a spring assembly comprising two or more spring members, the two or more spring members stacked together to align the holes of the first and second annular discs of the two or more spring members.

In some embodiments, the spring assembly further comprises at least one disc spring adjacent the spring member at the end of the spring assembly.

In some embodiments, there is provided a downhole tool comprising the spring assembly, the downhole tool for connection to a drill string to dampen forces in equipment housed inside the drill string.

BRIEF DESCRIPTION OF THE DRAWINGS

The invention is described with reference to the accompanying figures in which:

FIG. 13 is a schematic diagram of an axial and torsional force dampener configured to a drill string in accordance with one embodiment of the invention.

FIG. 15 is a side view of the assembled axial and torsional force dampener in a balanced position in accordance with one embodiment of the invention.

FIG. 16A is a cross sectional view taken along line A-A in FIG. 15 of the assembled axial and torsional force dampener in a balanced position in accordance with one embodiment of the invention.

FIG. 16B is a cross sectional view of the assembled axial and torsional force dampener of FIG. 15 in a compressed position in accordance with one embodiment of the invention.

FIG. 16C is a cross sectional view of the assembled axial and torsional force dampener of FIG. 15 in an extended position in accordance with one embodiment of the invention.

FIG. 19A is an enlarged cross sectional view of one spring member from the spring assembly shown in FIG. 18B in a neutral position.

FIG. 19B is an enlarged cross sectional view of the spring member from FIG. 19A in a neutral position with the elastomeric member removed.

FIG. 19C is an enlarged cross sectional view of the spring member from FIG. 19A in a compressed position.

FIGS. 19D, 19E and 19F are cross sectional views of alternative embodiments of the spring member.

FIGS. 21A, 21B and 21C are perspective, side and top views, respectively, of the cup member from the spring member in FIG. 19A.

FIG. 24A is a perspective view of the second spring assembly of the axial and torsional force dampener shown in FIG. 16A.

FIG. 24B is a cross sectional view of the second spring assembly of FIG. 24A taken along lines C-C.

DETAILED DESCRIPTION OF THE INVENTION

Figure 1:
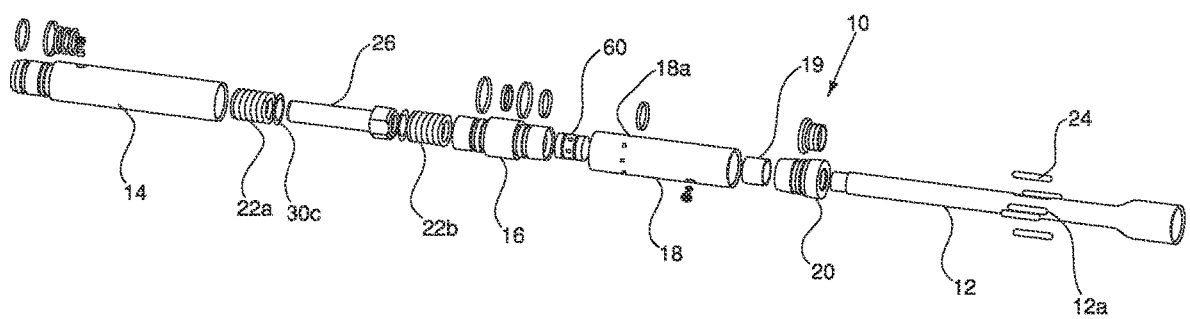
FIG. 1 is an exploded diagram of an axial and torsional force dampener in accordance one embodiment of the invention.

With reference to the figures, an axial, lateral and torsional force dampener (ALTFD) 10 is described. The ALTFD is attaches to the inside of a drillstring for dampening the highly destructive shock and vibrations imparted on electronic sensing equipment housed inside the drill string.

The ALTFD connects to a drillstring 100 as shown in FIG. 13. The drillstring 100 is raised and lowered relative to a surface drilling rig 100a that controls a downhole drilling process. At the end of the drillstring, the drillstring is connected to a drilling motor or bit sub 100b and drillbit 100c. Uphole of the drilling motor, the drillstring includes a landing sub 100d which has a seating device inside the drill string configured to receive equipment that is housed inside the drill string 100 for evaluating the formation. A cutaway 100f of the outer drill pipe of the drill string 100 is shown in FIG. 13 to illustrate the ALTFD 10 and sensor equipment 100e that are housed inside the drill string. A downhole end of the ALTFD 10 is connected to the landing sub 100d (the downhole end is not visible in FIG. 13 because it is inside the landing sub 100d). An uphole end 10a of the ALTFD 10 is connected to the sensor equipment 100e such that the ALTFD is positioned between the landing sub 100d and all sensor equipment 100e. The ALTFD allows movement of the sensor equipment inside the drill string 100 and provides damping to the sensor equipment without affecting the overall length of the drill string.

ALTFD Overview

The ALTFD 10 generally includes a lower end sliding shaft 12, an upper end sliding shaft 26, compression housing 14, mid-bulkhead 16, pin housing 18 and bottom stopper 20 that comprise the primary structural components of the ALTFD and that operatively contain other components of the system. The ALTFD is a pressure compensated, sealed and internally lubricated system. The foregoing components generally enable telescopic movement of the lower end sliding shaft 12 and the upper end sliding shaft 26 with respect to the other components (i.e. compression housing 14, mid-bulkhead 16, pin housing 18 and bottom stopper 20) whilst simultaneously dampening axial and torsional forces from the lower and upper end sliding shafts 12, 26, which thereby dampens forces being transferred to the sensor equipment 100e.

Figure 2:
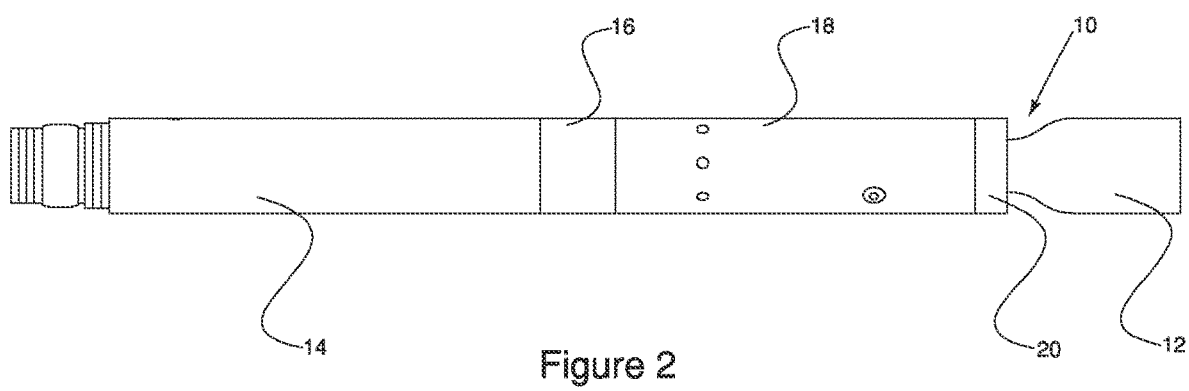
FIG. 2 is an assembled perspective diagram of an axial and torsional force dampener in a compressed position in accordance with one embodiment of the invention.
Figure 3:
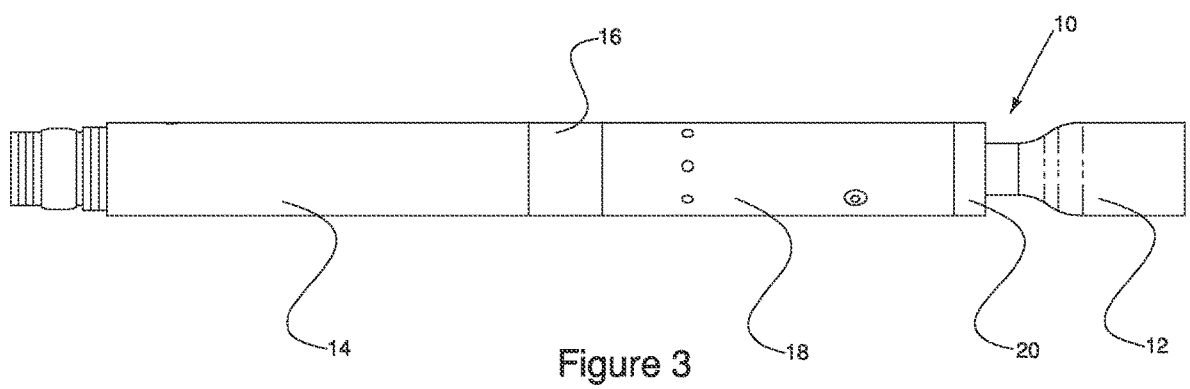
FIG. 3 is an assembled perspective diagram of an axial and torsional force dampener in an extended position in accordance with one embodiment of the invention.
Figure 4:
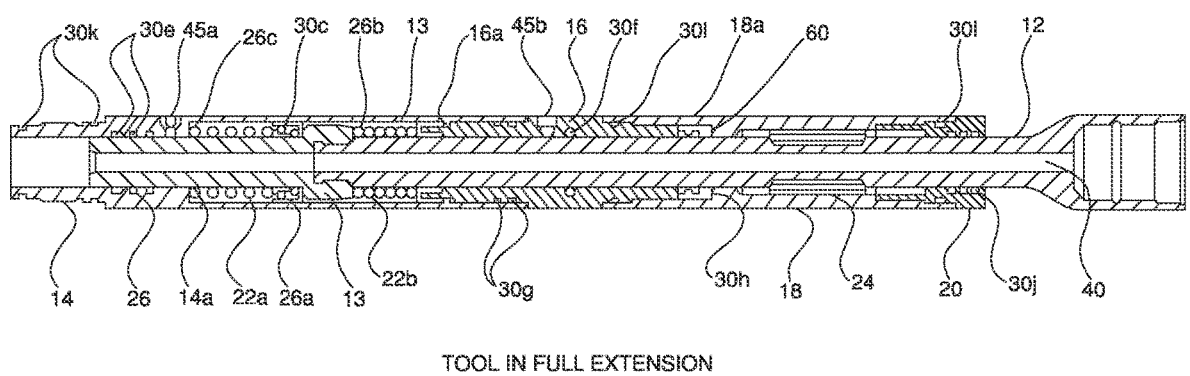
FIG. 4 is an assembled cross-sectional diagram of an axial and torsional force dampener in a fully-extended position in accordance with one embodiment of the invention.
Figure 5:
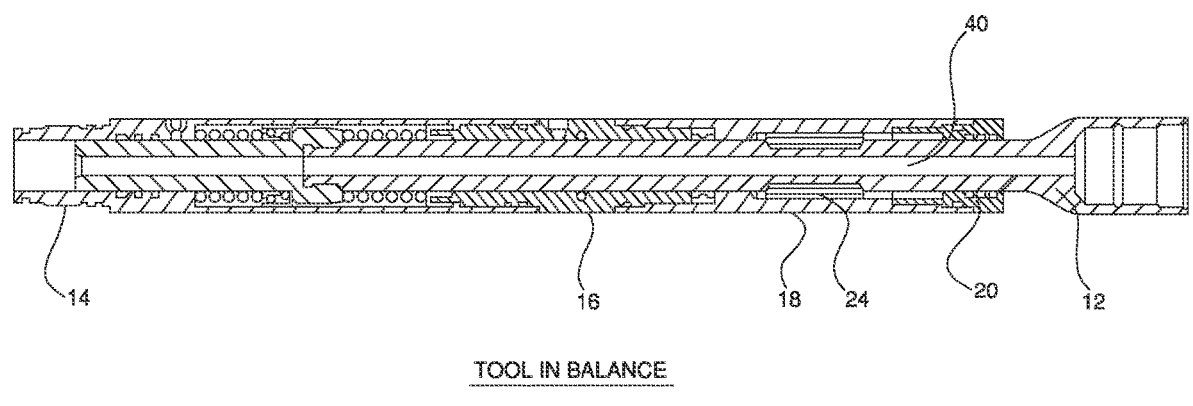
FIG. 5 is an assembled cross-sectional diagram of an axial and torsional force dampener in a balanced position in accordance with one embodiment of the invention.
Figure 6:
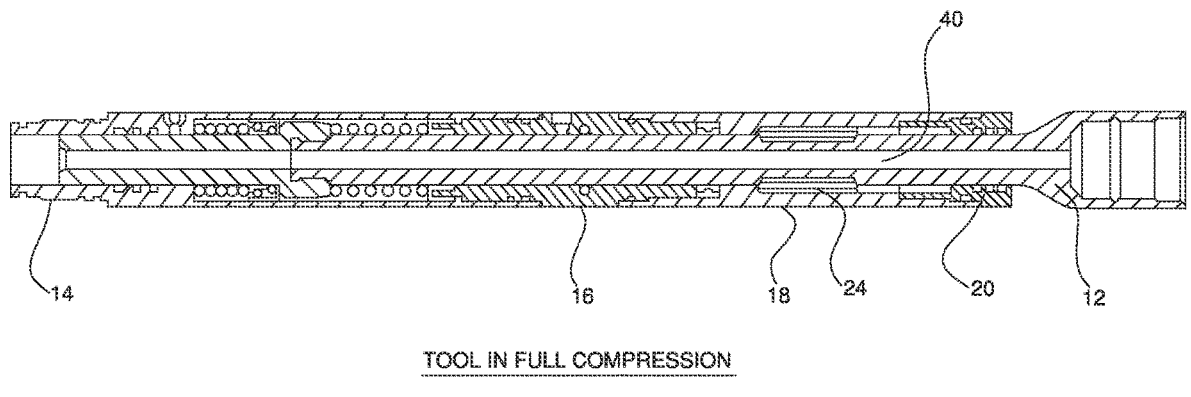
FIG. 6 is an assembled cross-sectional diagram of an axial and torsional force dampener in a fully-compressed position in accordance with one embodiment of the invention.
Figure 7:
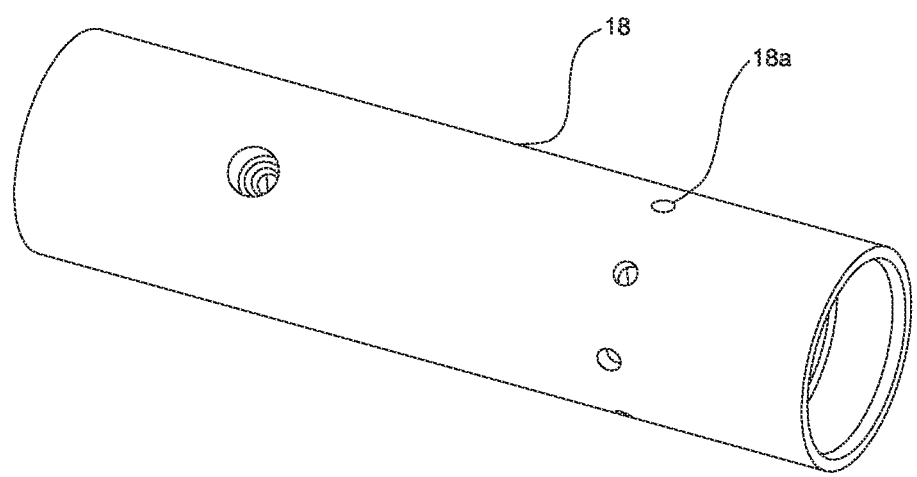
FIG. 7 is a perspective view of a pin housing of an axial and torsional force dampener in accordance with one embodiment of the invention.
Figure 8:
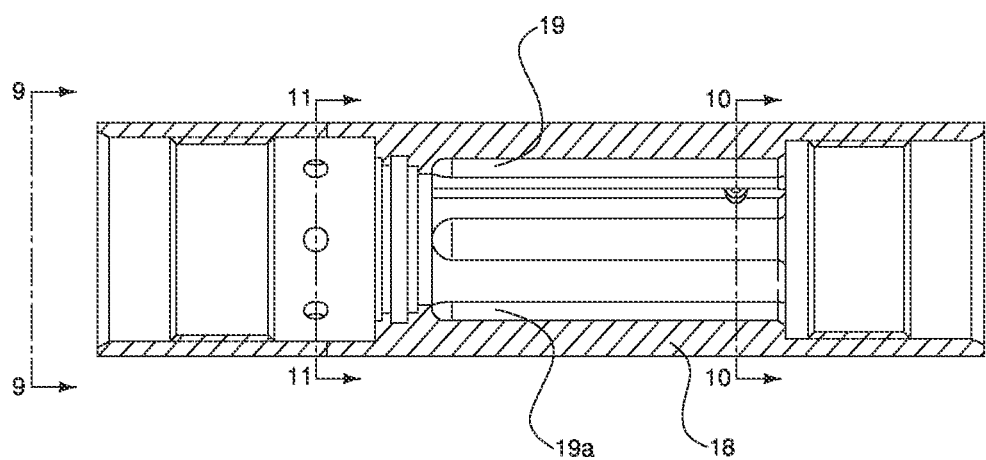
FIG. 8 is a cross-sectional view of a pin housing of an axial and torsional force dampener in accordance with one embodiment of the invention.
Figure 8A:
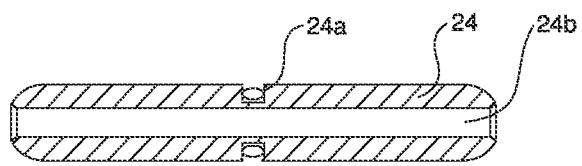
FIG. 8A is a cross-sectional view of a pin in accordance with one embodiment of the invention.

As shown in FIGS. 2-3 (side views) and FIGS. 4-6 (cross-sectional views), the ALTFD is moveable between a balanced position (FIG. 5) and a fully-compressed position (FIGS. 2 and 6) where during compression, the lower and upper end sliding shafts 12, 26 slide within the compression housing 14, mid-bulkhead 16 and pin housing 18 against spring 22a. With the release of a compression load, spring 22a returns the lower and upper end sliding shafts to the balanced position. Under axial tension, the ALTFD is moveable to a fully-extended position (FIG. 4) where the lower and upper end sliding shafts 12, 26 slide within the compression housing 14, mid-bulkhead 16 and pin housing 18 against spring 22b. Upon release of a tension load, spring 22b returns the lower and upper end sliding shafts to the balanced position.

As shown in FIGS. 1 and 7-11, the pin housing 18 operatively contains a plurality of pins 24 that engage with the pin housing 18 and the lower end sliding shaft 12 such that torsional force applied to the lower end shaft is transmitted through the pin housing 18, mid-bulkhead 16 and compression housing 14.

Importantly, each of the lower end sliding shaft 12, upper end sliding shaft 26, compression housing 14, mid-bulkhead 16, pin housing 18 and bottom stopper 20 are generally cylindrical with each having an internal throughbore 40 such that fluids may flow between the ends of the ALTFD within the assembled structure.

Further details of the assembly and operation of the system is provided below.

Pin Housing

Figure 11:
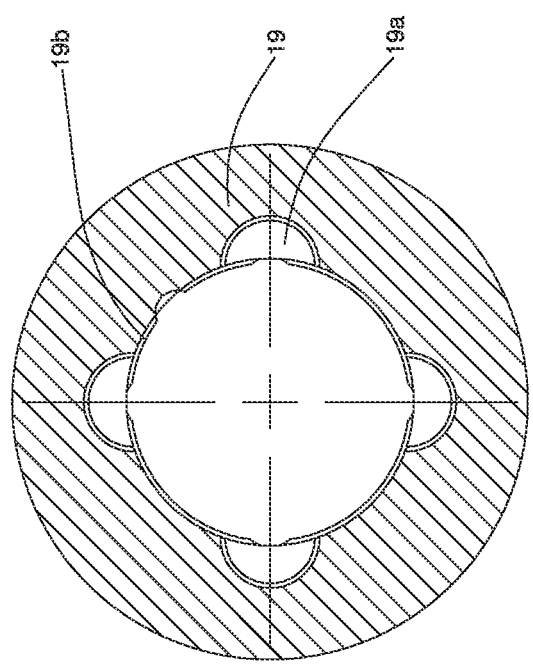
FIG. 11 is a cross-sectional view of a pin housing of an axial and torsional force dampener taken at line 11-11 of FIG. 8 in accordance with one embodiment of the invention.

As shown in FIGS. 7-11, the pin housing 18 operatively contains a pin housing sleeve 19 secured within the pin housing 18 by the bottom stopper 20. At its opposite end, the pin housing is secured to the mid-bulkhead 16. As best shown in FIG. 11, the pin housing sleeve 19 has a corrugated-shape cross-section that matingly engages within the pin housing 18. The pin housing sleeve 19 includes a plurality of pin slots 19a that engage with corresponding pins 24 as shown in FIGS. 1 and 4-6. Similarly, the lower end sliding shaft 12 includes corresponding recesses 12a that operatively engage pins 24.

In operation, the pins are simultaneously engaged within recesses 12a in the lower end sliding shaft 12 and pin slots 19a in the pin housing sleeve 19 such that the pins 24 can slide within the pin slots 19a to allow axial movement between the lower end sliding shaft 12 and the pin housing 18.

Figure 9:
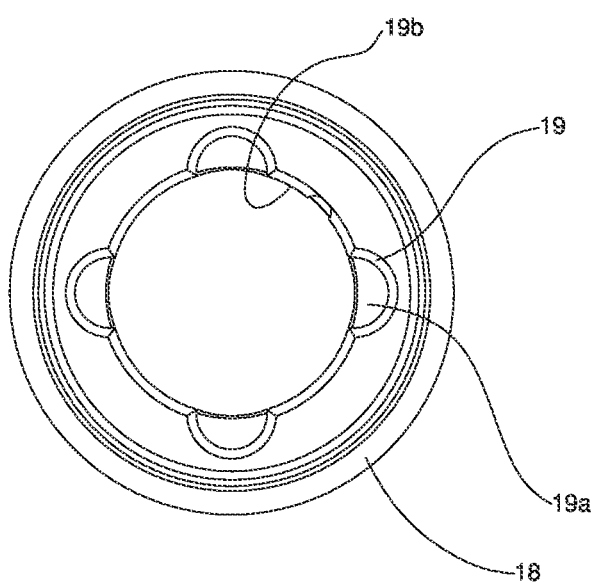
FIG. 9 is an end view of a pin housing of an axial and torsional force dampener in accordance with one embodiment of the invention.
Figure 10:
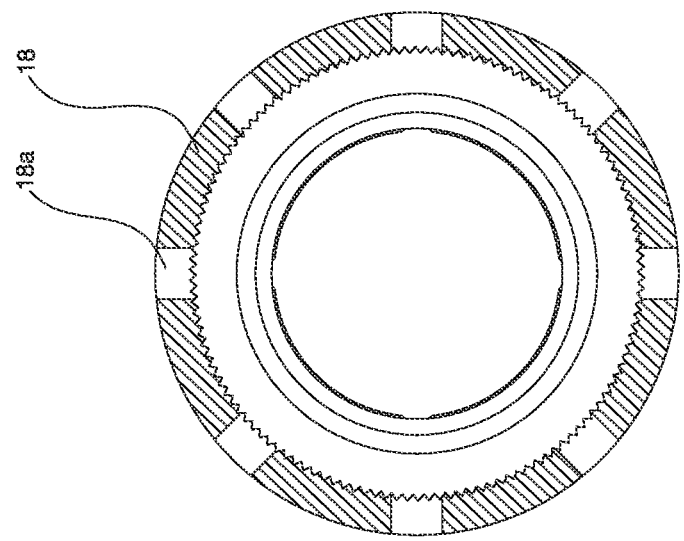
FIG. 10 is a cross-sectional view of a pin housing of an axial and torsional force dampener taken at line 10-10 of FIG. 8 in accordance with one embodiment of the invention.

As shown in FIGS. 9 and 11, the pin slots 19a are arranged within the pin housing sleeve 19 in pairs in diametrically opposed positions generally defining four points of a square. Between each pin slot 19a, the inner surface 19b of the pin housing sleeve is slightly concave and generally corresponds in curvature to outer diameter of the bottom end shaft 12. This configuration, where roughly half of the diameter of each pin 24 is retained in each of the pin slots 19a and recesses 12a allows the lower end sliding shaft 12 to move axially but will not allow or will substantially limit rotation of the bottom end shaft relative to the compression housing 14 (i.e. provides an "anti-rotation" component).

The pin housing sleeve 19 is press-fit within the pin housing and is preferably manufactured from high nitryl butyl rubber (HNBR) which assists in the overall torsional strength of the tool. That is, the HNBR rubber in contact with the pin chamber's inner housing provides a degree of torsional cushioning during rotation. In one embodiment, the pin housing sleeve 19 is steel.

In one embodiment, the pins are 2 inch long, nitrated 17-4 stainless rods having a 0.312 inch diameter. The torsional force limit is determined by the shear strength of the pins. Other materials such as Torlon™ may also be utilized. Preferably, each of the pins have a throughbore 24b to enable fluid pressure equalization during operation. The throughbore 24b in the pins allows hydraulic fluid to pass through the pins which provides hydraulic dampening.

The pins may include one or more dampening devices 24a (such as a rubber o-ring) as a component of the pin structure to provide additional dampening between the pin and the pin housing.

It should be noted that while the anti-rotation components are described with four pins and corresponding slots, other pin arrangements may be utilized.

Torsion Cartridge

Figure 14:
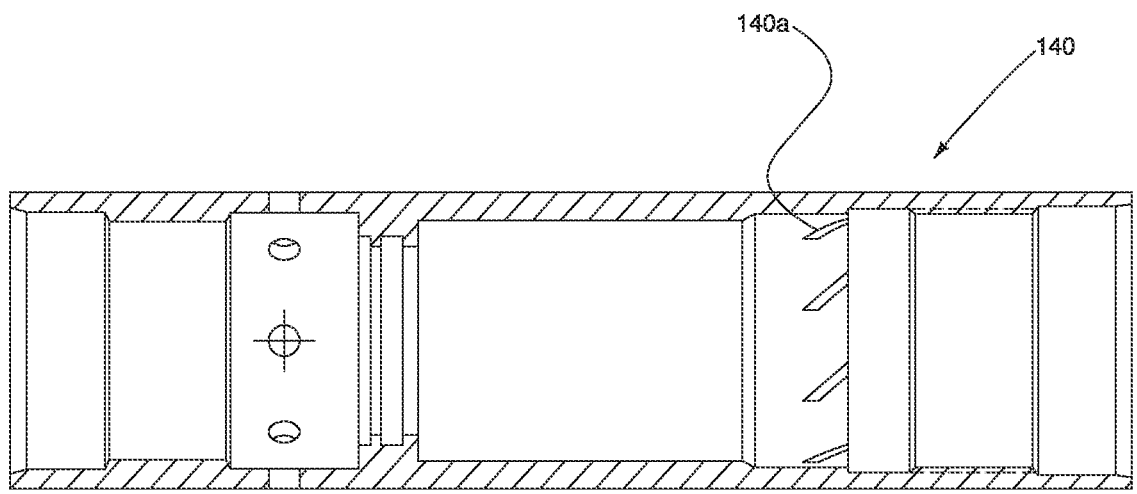
FIG. 14 is a cross-sectional view of an alternate pin housing (outer torsion housing) in accordance with one embodiment of the invention.
Figure 14A:
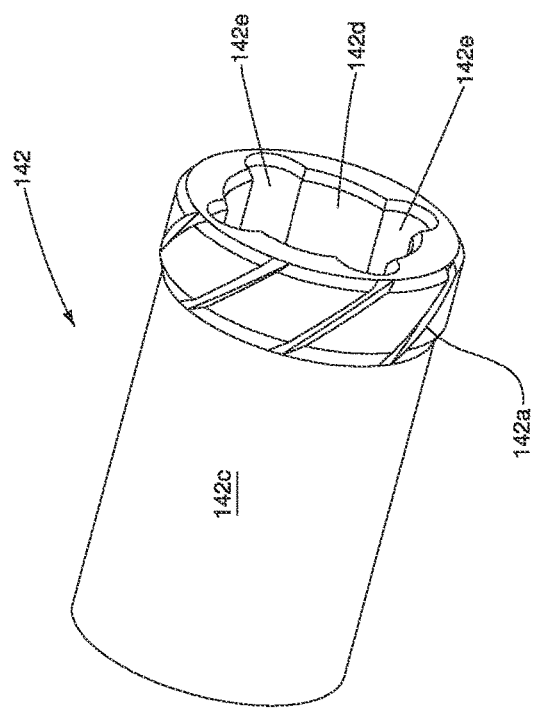
FIG. 14A is a perspective view of an inner torsion cartridge in accordance with one embodiment of the invention.
Figure 14B:
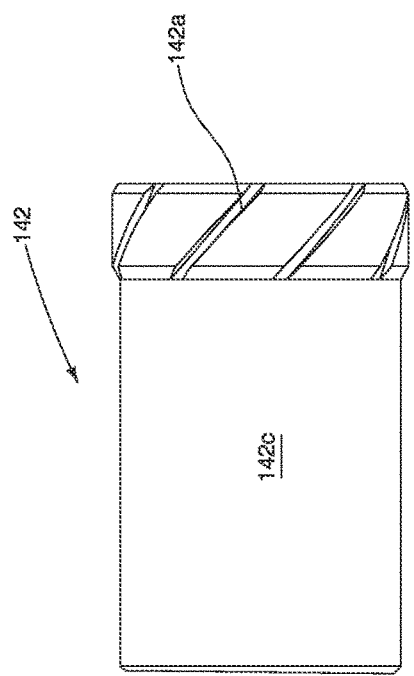
FIG. 14B is a side view of an inner torsion cartridge in accordance with one embodiment of the invention.
Figure 14C:
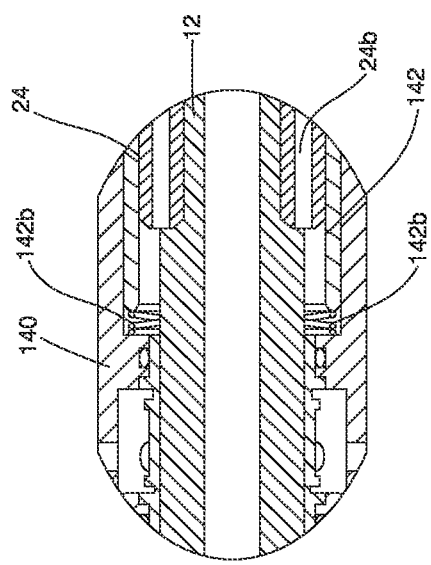
FIG. 14C is a cross-sectional view of a portion of an axial and torsional force dampener in accordance with one embodiment of the invention and showing details of the position of a disk spring relative to an inner torsion cartridge.

FIGS. 14, 14A, 14B, 14C and 14D show an alternate embodiment of the pin housing 140 which includes a torsional cartridge 142 inside the pin housing that enables further dampening within the pin housing. In this embodiment, referring to FIG. 14, the pin housing 140 has helical splines 140a on the inner surface for engaging with corresponding helical grooves 142a on the outer surface 142c of the torsional cartridge, which is shown in FIGS. 14A and 14B. Alternatively, the grooves and splines could be reversed such that the pin housing inner surface includes helical grooves, and the torsional cartridge outer surface includes corresponding helical splines. The engagement of the grooves and splines allows axial movement of the torsion cartridge 142 with respect to the pin housing 140.

Referring to FIGS. 14A and 14B, the torsion cartridge 142 includes pin slots 142e on its inner surface 142d for engaging pins 24 between the torsion cartridge inner surface 142d and the lower end sliding shaft 12 outer surface. The pin slots 142e in the torsion cartridge are similar to the pin slots 19a described above with reference to the pin housing sleeve 19. That is, the internal profile of the torsion cartridge is similar to the internal profile of the pin housing sleeve 19 shown in FIG. 11, wherein the pin slots 142e are spaced apart around the inner surface 142d of the torsional cartridge and run parallel with the longitudinal axis of the torsion cartridge 140. The pin slots 142e are longer in length than the pins 24 to allow axial movement of the lower end sliding shaft 14 with respect to the torsional cartridge 142 and pin housing 140. The width of the pin slots 142 is sized to contain the pins 24 snugly to prevent rotational movement.

As described previously, the lower end sliding shaft 12 has recesses 12a that contain the pins 24 in conjunction with the pin slots 142e. The recesses 12a may be sized to fit the pins 24 snugly, or they may be slightly longer, for example ¼". The engagement of the pins 24 in pin slots 142e and recesses 12a limits rotational movement of the torsion cartridge relative the lower end sliding shaft, while still allowing for axial movement to a certain extent as limited by the length of the pin slots 142e. Hydraulic fluid is retained around the pins 24 in the pin slots 142e to provide hydraulic dampening during movement of the pins The torsional cartridge 142 may be lined with a cushioning sleeve (not shown) to provide additional dampening between the pin slots 142e and the pins 24. The cushioning sleeve may be made of a rubber material such as high nitryl butyl rubber (HNBR).

Figure 14D:
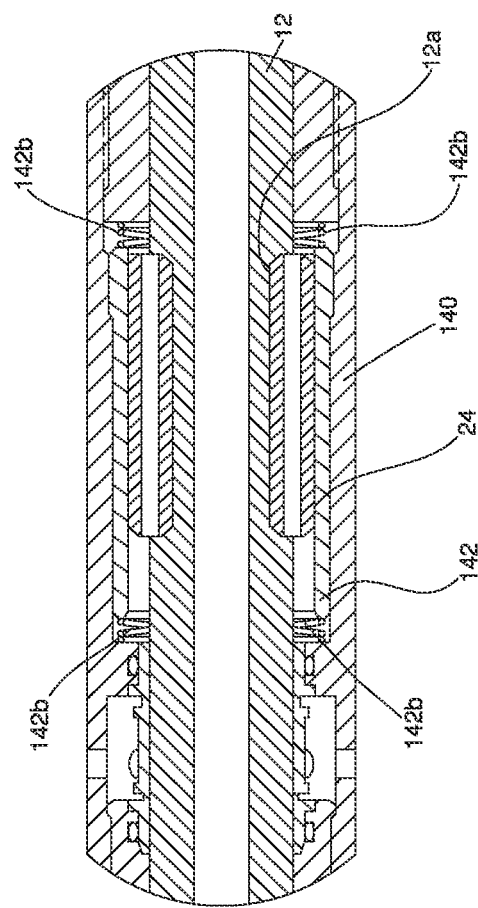
FIG. 14D is a cross-sectional view of a portion of an axial and torsional force dampener in accordance with one embodiment of the invention and showing details of the position of uphole and downhole disk springs relative to an inner torsion cartridge.

As shown in FIG. 14D, one or more disc springs 142b, also known as Belleville washers, are positioned at both ends of the torsion cartridge 142 such that the axial displacement of the torsion cartridge will act against these disc springs 142b. As such, high torsional forces being applied to the lower end sliding shaft 12 will be dampened by the axial movement of the torsion cartridge against these disc springs.

The torsion cartridge 142 is retained within the alternate pin housing by bottom end cap 20. The torsion cartridge 142 and pin housing 140 are preferably made of metal.

In operation, a torsional force exerted on the lower end sliding shaft 12 will cause the torsion cartridge 142 to move axially but not rotationally with respect to the lower end sliding shaft via the pins 24 engaged with pin slots 12a. A small amount of rotational movement may occur, for example up to 5 degrees in either direction (clockwise or counterclockwise) with respect to the lower end sliding shaft. The rotational and axial movement is dampened initially via the hydraulic fluid surrounding the pins, which provides increasing resistance as movement progresses. The axial movement is then further dampened via the disc springs 142b at either end of the torsion cartridge.

The connection of the torsion cartridge 142 to the pin housing 140 via splines 140a and recesses 142a allows some relative axial and rotational movement between these two components. After the maximum displacement between these two components occurs, any remaining force is transferred from the torsional cartridge to the pin housing and then to the mid bulkhead 16, compression housing 18, and finally to the sensor equipment attached to the ALTFD. As such, the torsion cartridge 142 and pin housing 140 provide torsional force dampening in the ALTFD.

Force Dampening, Assembly and Other Design Features

As best shown in FIG. 1 in the exploded view and in FIGS. 4-6, the ALTFD is assembled as a series of interlocking parts along the longitudinal axis of the tool that operatively provide the anti-torsional, lateral and axial force dampening functionalities, and allow for ease of assembly and disassembly for servicing each embodiment.

Axial force dampening is achieved through springs 22a, 22b which act to bias the ALTFD to its balanced position. As shown, spring 22a is seated over upper end sliding shaft 26 within chamber 26a defined between the compression housing 14 and outer surface of the upper end sliding shaft 26. As such, spring 22a is seated against an inner surface 14a of the compression housing 14 and an outer surface 26c of the upper end sliding shaft 26. The upper end sliding shaft 26 slides relative to the compression housing.

On the downhole end of the upper end sliding shaft 26, spring 22b is seated over bottom end shaft 12 within chamber 13 defined between the compression housing 14, bottom end shaft 12, mid-bulkhead 16 and upper end sliding shaft 26. As shown, spring 22b is thereby seated against downhole end surface 26b of the upper end sliding shaft 26 and uphole end surface 16a of the mid-bulkhead 16.

As such, the upper end sliding shaft 26 prevents separation of the components under axial tension by the engagement of the upper end sliding shaft 26 with the mid-bulkhead 16.

In addition, within each of the chambers 13 and 26a, hydraulic fluid is retained for enhanced dampening. Accordingly, appropriate seals are provided throughout the tool to contain the hydraulic fluid within the chambers while also sealing any high pressure fluids within the throughbore 40 of the ALTFD.

More specifically, a series of o-rings 30a, 30b within o-ring housings 30c and 30d provide seals to chambers 26a and 13.

In addition, o-rings 30e are provided to seal the upper end sliding shaft 26 with respect to compression housing 14; o-rings 30f are provided to seal the mid-bulkhead 16 with respect to the bottom end shaft 12; o-rings 30g are provided to seal the mid-bulkhead 16 with respect to the compression housing 14; o-ring 30h is provided to seal the pin housing 18 with respect to the bottom end shaft 12; o-ring 30i is provided to seal the pin housing 18 with respect to the bottom stopper 20; o-rings 30j are provided to seal the bottom stopper 20 with respect to the bottom end shaft 12; o-rings 30k are provided to seal the compression housing 14 to the drillstring; and o-ring 30l is provided to seal the pin housing 18 with respect to the mid-bulkhead 16.

Preferred o-rings include Viton™ Polypac™ and Polymite™.

The chambers are filled through respective oil fill ports 45a, 45b.

Dampening

Springs 22a, 22b and pillow blocks 30c, 30d provide axial dampening. The springs are preferably designed to be utilized at 50% of their technical limit for free height retention and maximum life cycles. Generally, the springs are a consumable component within the tool with it being estimated that they will require replacement at around 750 hours of usage. The harmonic frequency of the ALTFD is estimated to be approximately 4.8 Hz which is well below the operating frequency of drillstring agitation devices which are typically 16-26 Hz.

The outer surfaces of the springs 22a, 22b may be coated with rubber to provide further dampening and to provide a travel limiter as the springs compress. The rubber causes progressive rate dampening of the springs 22a, 22b. As the spring compresses, the rubber deforms and expands out the sides of the spring to contact the walls of the chamber 26a, 13 in which the spring sits. As more rubber is extruded and contacts the chamber walls, more force is required to compress the spring.

The pillow blocks 30c, 30d absorb the low end harmonic vibration that is transmitted axially through the tool and augment the performance of the springs which are designed to absorb the higher G impact events or agitation. The pillow block design allows for extrusion of the internal o-ring elements in order to create absorption. Depending on usage, it is recommended to replace o-rings at every service or 500 hours at a maximum.

Alternative Spring Assembly

Figure 17:
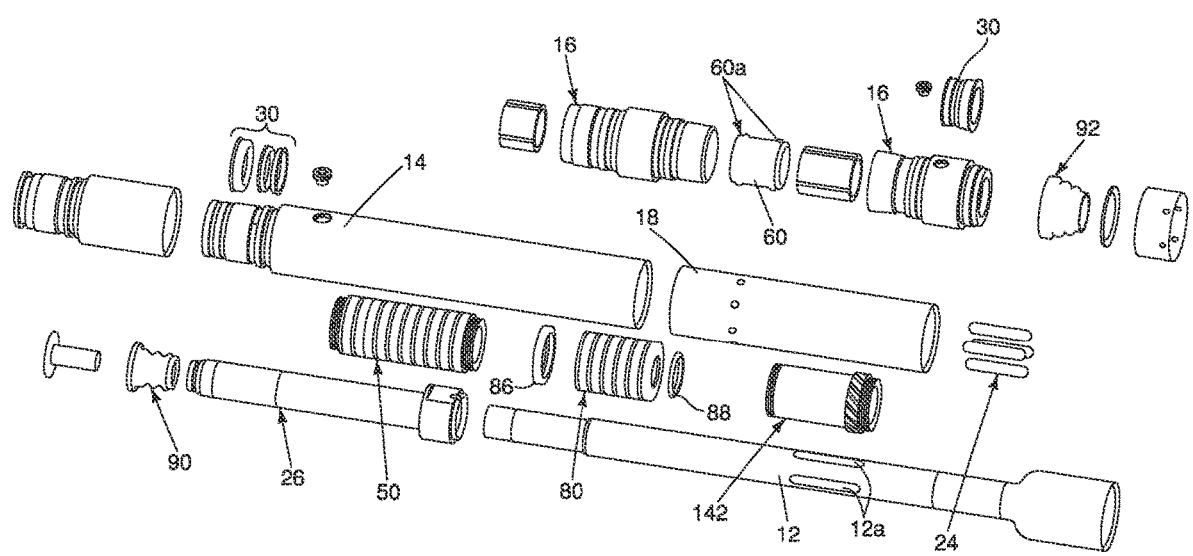
FIG. 17 is an exploded diagram showing the parts of the axial and torsional force dampener of FIG. 15.

FIGS. 15 to 17 illustrate another embodiment of the ALTFD 10. In this embodiment, the first and second springs 22a, 22b are replaced with a first spring assembly 50 and second spring assembly 80 that are located in chambers 26a, 13 and dampen axial forces during telescopic movement of the lower end sliding shaft 12 and the upper end sliding shaft 26 with respect to compression housing 14.

First Spring Assembly

The first spring assembly 50 is seated in chamber 26a located between the compression housing 14 and the upper end sliding shaft 26. The uphole end 50a of the first spring assembly is seated against a shoulder 14b of the compression housing. The downhole end 50b of the first spring assembly is seated against a shoulder 26d of the upper end sliding shaft 26.

When an axial force is exerted on the lower end sliding shaft 12, the lower and upper end sliding shafts 12, 26 move telescopically within the compression housing 14. A compression force in the uphole direction, shown by arrow 110 in FIG. 16B, causes the sliding shafts 12, 26 to move uphole. This compresses the chamber 26a as the shoulder surface 26d on the upper end sliding shaft moves uphole, thereby compressing the first spring assembly 50 towards the shoulder surface 14b on the compression housing, moving the ALTFD 10 into the compressed position shown in FIG. 16B.

When the compression force 110 is released, the first spring assembly 50 rebounds to its neutral position, which biases the chamber 26a and therefore the entire ALTFD back to its neutral position shown in FIG. 16A.

The components of the spring assemblies and how they operate will now be described in more detail.

Figure 18A:
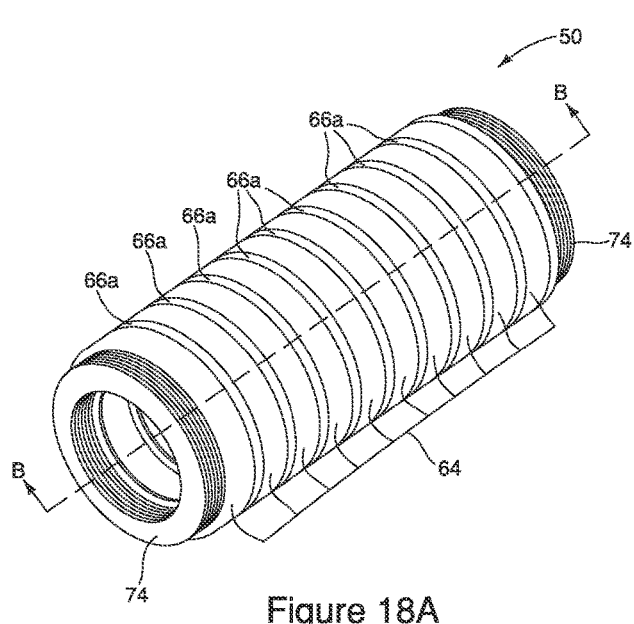
FIG. 18A is a perspective view of a first spring assembly of the axial and torsional force dampener shown in FIG. 16A.
Figure 18B:
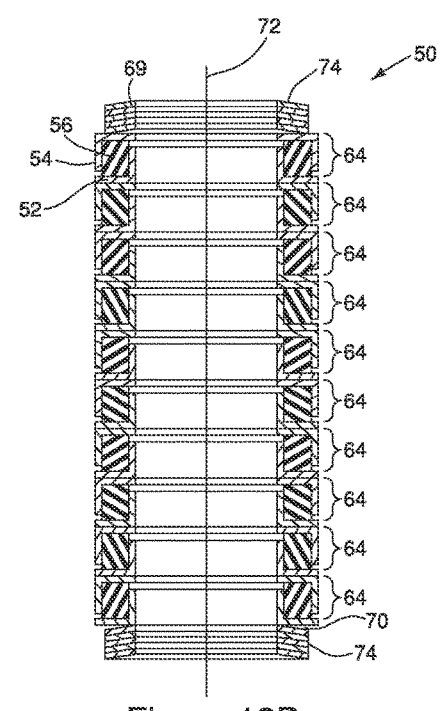
FIG. 18B is a cross sectional view of a first spring assembly of the axial and torsional force dampener taken along line B-B of FIG. 18A.

FIGS. 18A and 18B illustrate the first spring assembly 50. The spring assembly 50 comprises multiple spring members 64 stacked coaxially. At each end of the first spring assembly 50, there is a disc spring assembly 74.

The Spring Members

Each spring member 64 is made up of a flange member 52, a cup member 54 and an elastomeric member 56 arranged together as shown in FIG. 19A.

Figure 20B:
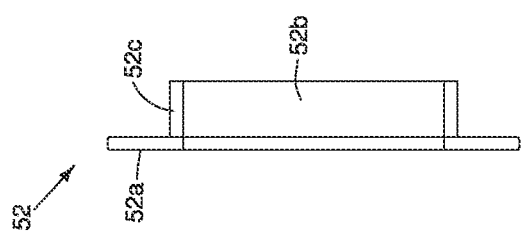
FIGS. 20A, 20B and 20C are perspective, side and top views, respectively, of the flange member from the spring member in FIG. 19A.
Figure 20A:
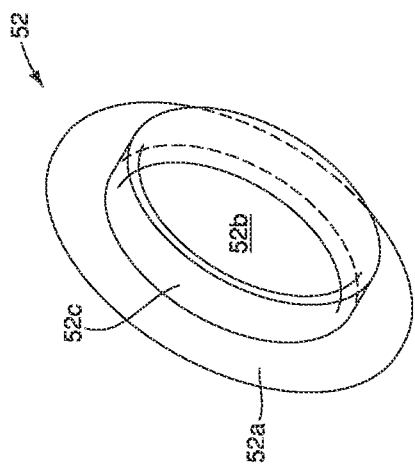
Figure 20C:
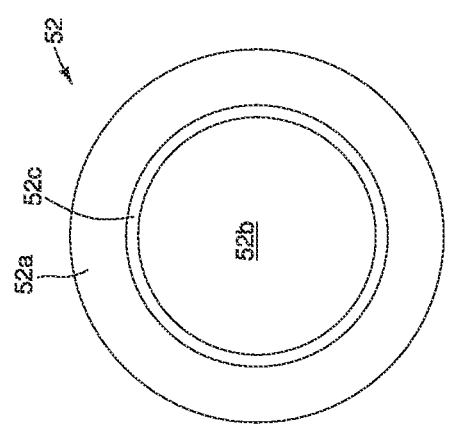

FIGS. 20A, 20B and 20C illustrate the flange member 52 of the spring member 64. The flange member is made up of an annular disc 52a with a hole 52b in the center, and an annular wall 52c disposed around the inner edge of the annular disc 52a.

FIGS. 21A, 21B and 21C illustrate the cup member 54 of the spring member 64. The cup member is made up of an annular disc 54a with a hole 54b in the center, and an annular wall 54c disposed around the outer edge of the annular disc 54a.

Figure 22A:
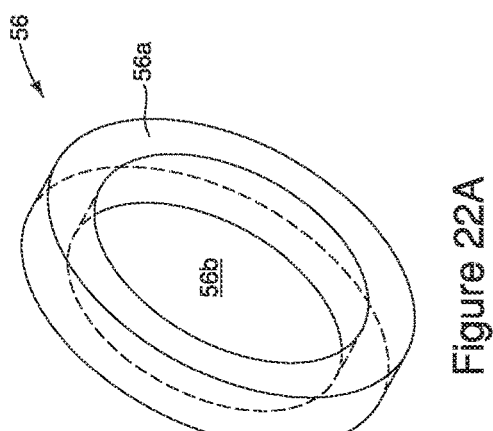
FIGS. 22A, 22B and 22C are perspective, side and top views, respectively, of the elastomeric member from the spring member in FIG. 19A.
Figure 22B:
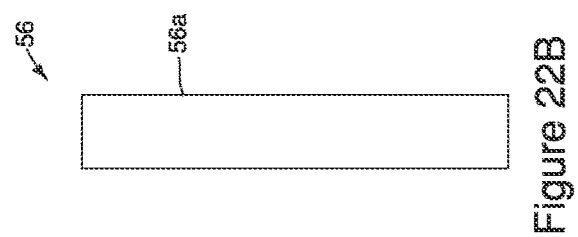
Figure 22C:
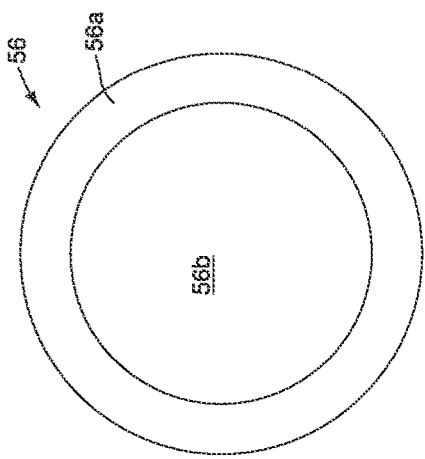

FIGS. 22A, 22B and 22C illustrate the elastomeric member 56 of the spring member 64. The elastomeric member 56 comprises a ring 56a with a hole 56b in the middle. It is made of an elastomeric material such as a fluoroelastomer (e.g. Viton™) or a nitrile rubber, including hydrogenated nitrile rubber (HNBR).

The flange member 52 and the cup member 54 are stacked together as shown in FIGS. 19A and 19B whereby the hole 52b in the flange member lines up with the hole 54b in the cup member. The stacking of the flange member 52 and the cup member 54 create an annular channel 62 (see FIG. 19B) between the annular discs 52a, 54a and annular walls 52c, 54c of the flange member and cup member. The elastomeric member 56 is retained within the annular channel 62 (see FIG. 19A).

The components of the spring member 64 (i.e. the flange member 52, cup member 54 and elastomeric member 56) may be held together simply by being retained in a space, for example the chamber 26a of the ALTFD 10. Alternatively, the components may be glued, molded or fastened together. For example, the elastomeric member 56 may be glued or molded to the flange member and/or cup member.

The orientation of the spring member 64 in the spring assemblies 50, 80 can vary. FIG. 18B illustrates the spring members 64 stacked parallel so that the cup members 54 and flange members 52 are oriented in the same direction. However the spring members can also be stacked in series (alternating directions) or in a combination of parallel and series. In addition, the spring members can face either direction with respect to the uphole and downhole end of the ALTFD.

The flange member 52 and the cup member 54 are preferably metal components coated with Teflon™ or Nickel Teflon™ to allow the components to more easily move and slide with respect to one another.

Damping Operations of the Spring Member

In operation, each spring member 64 of the first spring assembly 50 can move between a neutral position as shown in FIG. 19A and a compressed position as shown in FIG. 19C to dampen axial forces exerted on the spring assembly.

Referring to FIG. 19A, in the neutral position, the flange member 52 and the cup member 54 are spaced apart from one another so that they do not contact each other. This results in two gaps: a) an outer annular gap 66a between the annular disc 52a of the flange member and the annular wall 54c of the cup member, and b) an inner annular gap 66b between the annular disc 54a of the cup member and the annular wall 52c of the flange member.

In the neutral position of the spring member, the elastomeric member 56 is in an undeformed state and does not fill the entire annular channel 62. Instead, there is a gap 68 in the annular channel 62. The gap may be around the outermost portion of the annular channel 62 (FIG. 19A).

Referring to FIG. 19C, in the compressed position of the spring member 64, the flange member 52 and the cup member 54 abut one another such that there are no gaps between the spring member and cup member. The annular channel is closed with no gaps between the walls of the annular channel, the walls being formed by the annular discs 52a, 54a and annular walls 52c, 54c of the cup member and flange member.

In the compressed position, the elastomeric member 56 is in a deformed state and has flattened and expanded radially outwards to fill the annular channel 62. The movement of the cup member 54 and flange member 52 towards each other as the spring member 64 compresses closes the walls of the annular channel 62 and directs the deformation of the elastomeric member. The closed annular channel prevents the elastomeric member 56 from extruding out of the channel and instead directs the elastomeric member to move into the gap 68 that was present in the annular channel.

When an axial force along the longitudinal axis 72 is exerted on the spring member 64, the spring member moves from the neutral position (FIG. 19A) to the compressed position (FIG. 19B) to absorb the force. This movement forces the elastomeric member 56 to deform, which results in force damping through hysteresis. In other words, elastomeric damping occurs due to internal friction in the elastomeric member as it deforms, causing energy to be dissipated as thermal energy.

Each spring member 64 in the first spring assembly 50 provides damping of axial forces along the longitudinal axis 72 of the first spring assembly 50.

Second Stage of Damping Provided by the Disc Spring Assemblies

Once all the spring members 64 in the spring assembly 50 are fully compressed, a second stage of damping occurs via the disc spring assemblies 74 at the ends of the spring assembly 50.

Figure 23A:
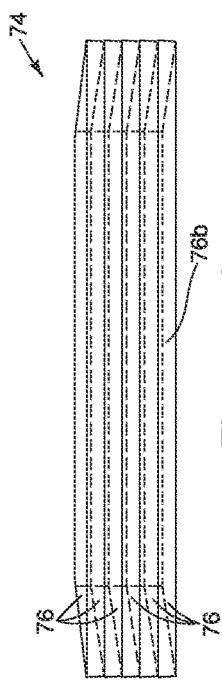
FIG. 23A is an enlarged cross-sectional view of the disc spring assembly shown in FIG. 18B.
Figure 23C:
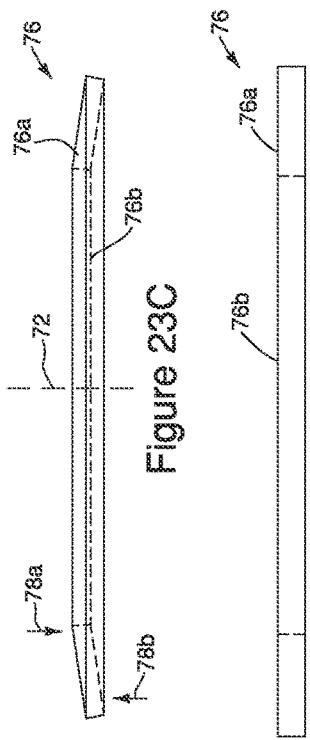
FIGS. 23B and 23C are a top and side view, respectively of one disc spring from the disc spring assembly of FIG. 23A.
Figure 23D:
FIG. 23D is a side view of the disc spring of FIG. 23C in a compressed position.
Figure 23B:
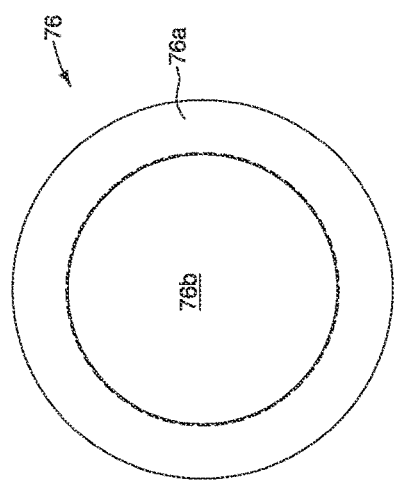

Referring to FIG. 23A, each disc spring assembly 74 is made up of a plurality of disc springs 76, commonly referred to as Belleville washers. An individual disc spring 76 is shown in FIGS. 23B and 23C. The disc spring is shaped like a washer (i.e. an annular disc 76a with a hole 76b in the center) having a frusto-conical shape or cupped shape. When an axial force is applied on the disc spring along a longitudinal axis 72, the annular disc 76a flattens out to move from a frusto-conical or cupped shape in the neutral position (FIG. 23C) to a substantially flat disc in the fully compressed position (FIG. 23D) to dampen the force. When the force is removed, the disc spring rebounds to its neutral position. The disc spring can dampen axial forces from either direction, shown by arrows 78a, 78b in FIG. 23C.

Referring to FIG. 23A, the disc springs 76 are stacked coaxially with the holes 76b lined up to create the disc spring assembly 74. The disc springs are shown stacked in a parallel manner, i.e. the angled surface of each disc spring are all facing the same direction, but they also may be stacked in series (i.e. alternating directions) or in a combination of series and parallel.

Preferably, the disc spring 76 adjacent the cup member 54 is oriented so that the gap 69 between the angled annular disc 76a of the disc spring faces inward towards the hole 54b in the center of the cup member. Preferably, the disc spring 76 adjacent the flange member 52 is oriented in the opposite direction so that the gap 70 between the angled annular disc 76 of the disc spring faces outward towards the outer edge of the flange member. This orientation maximizes the dampening capabilities of the disc springs and spring members and is shown in FIG. 18B.

The Second Spring Assembly

The second spring assembly 80 provides additional axial force dampening in the ALTFD 10 for both compressive forces in an uphole direction and extension forces in a downhole direction.

The second spring assembly 80 is shown in FIGS. 24A and 24B. It is similar to the first spring assembly 50 in that it comprises a stack of one or more spring members 84. The spring members 84 have the same components as the spring members 64 of the first spring assembly, i.e. a flange member, a cup member and an elastomeric member. Therefore the details of the spring members 64 of the first spring assembly 50 are applicable to the second spring assembly 80.

The second spring assembly 80 also comprises an uphole and downhole catch member 86, 88 at either end which engage with other components of the ALTFD. Referring to FIGS. 16A, 16B and 16C, the uphole catch member 86 engages with the compression housing 14 to prevent movement of the uphole end 80a of the second spring assembly 80 with respect to the compression housing 14. The downhole catch member 88 engages with the lower end sliding shaft 12 to prevent movement of the downhole end 80b of the second spring assembly 80 with respect to the lower end sliding shaft 12.

Figure 25:
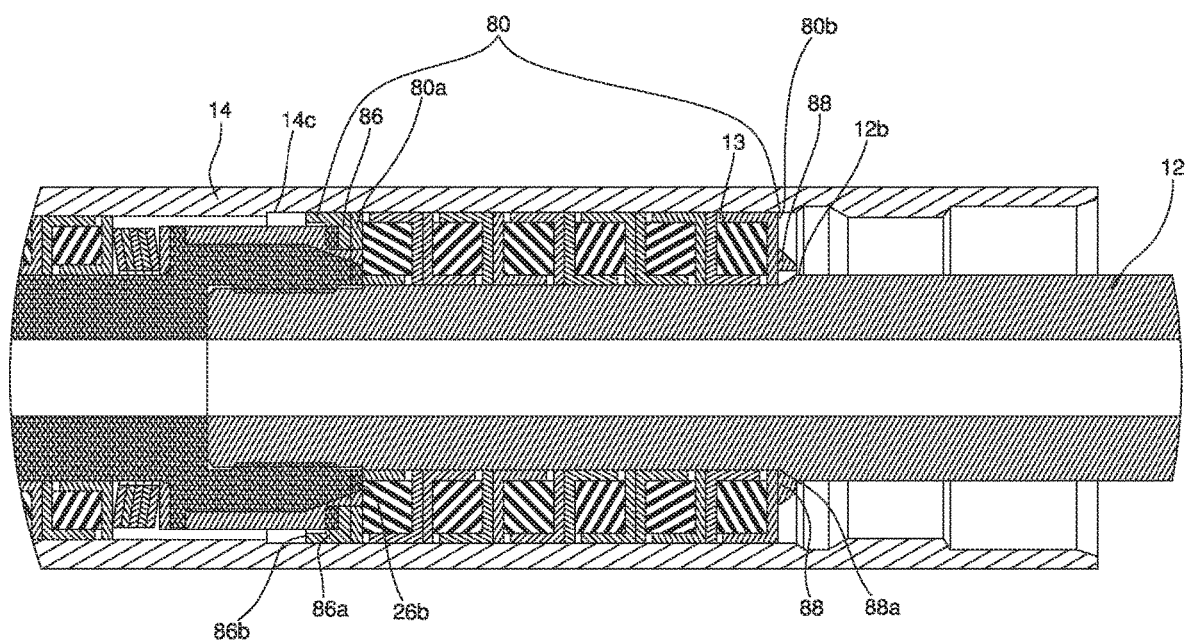
FIG. 25 is an enlarged view of the second spring assembly in the assembled axial and torsional force dampener taken from section D in FIG. 16A.

FIG. 25 provides an enlarged view of the second spring assembly 80 in the ALTFD to show how the uphole and downhole catch members 86, 88 engage. The uphole catch member 86 has a lip 86a with an uphole end 86b that abuts a shoulder 14 in the inner wall of the compression housing 14. This abutment prevents the second spring assembly 80 from moving further uphole with respect to the compression housing 14.

The downhole catch member 88 has a downhole end 88a which catches a shoulder 12b on the lower end sliding shaft 12, thereby causing the downhole end 88a of the downhole catch member 88 to move with the lower end shaft 12 as the lower shaft travels uphole.

FIGS. 24A and 24B illustrate the uphole catch member 86 as comprising an annular ring with outer lip 86a. The downhole catch member 88 is illustrated as a frusto-conical shaped ring. Other shapes and configurations can be used for the uphole and downhole catch members 86, 88.

The second spring assembly 80 is seated in chamber 13 located between the compression housing 14 and the lower end sliding shaft 12. The uphole end 80a of the first spring assembly is seated against the downhole end surface shoulder 26b of the upper end sliding shaft 26. The downhole end 80b of the first spring assembly is seated against the uphole end surface 16a of the mid-bulkhead 16.

Engagement and Disengagement of the Second Spring Assembly

When the ALTFD is compressed (i.e. an axial force is applied in the uphole direction shown by arrow 110 in FIG. 16B) the lower and upper end sliding shafts 12, 26 move uphole with respect to the compression housing 14 and the mid-bulkhead 16. The first spring assembly 50 provides the initial dampening action since the chamber 26a it is located in compresses. The chamber 13 in which the second spring assembly 80 sits in initially expands due to the downhole end surface 26b of the upper end sliding shaft 26 moving in the uphole direction with respect to the mid-bulkhead 16. As such, the second spring assembly 80 does not initially provide any dampening during compression of the ALFTD.

When the spring members 64 of the first spring assembly 50 have fully compressed, the sliding shafts 12, 26 will have moved uphole enough that the catch members 86, 88 on the second spring assembly 80 are in a position to engage with the compression housing 14 and the lower end sliding shaft 12. Therefore further application of a compression force will cause the second spring assembly to engage via the catch members 86, 88. Once engaged, the second spring assembly compresses to provide additional axial compressive dampening as needed. The disc spring assemblies 74 on the first spring assembly 50 continue to also provide compressive dampening while the second spring assembly is engaged.

When the compressive axial forces are removed, the first spring member 50, along with the second spring member 80 if it was engaged, rebound the ALTFD 10 back to neutral position. During the rebound, the catch members 86, 88 disengage due to the downhole movement of the lower end sliding shaft 12.

When an axial extension force is applied on the ALTFD 10, i.e. an axial force in the downhole direction shown by arrow 112 in FIG. 16C, the chamber 13 and therefore the second spring assembly 80 compress. This is due to the upper end sliding shaft 26 moving downhole with respect to the mid bulkhead 16, which together make up the end borders of the chamber 13. The compression of the second spring assembly 80 provides axial force dampening during elongation. The first spring assembly 50 does not engage during extension. Upon removal of the extension force, the second spring assembly rebounds the ALTFD 10 back to neutral.

The ALTFD 10 can operate with only the first spring assembly 50. The second spring assembly 80 is optional and is used to provide additional dampening action.

Alternative Embodiments

The first spring assembly 50 and the second spring assembly 80 are illustrated as having ten spring members 64 and six spring members 84, respectively (see FIGS. 18B and 24B). However, any number of spring members can be used in the spring assembly and it is possible to use only one spring member which would provide a damping effect on its own.

The first spring assembly 50 is shown as having a disc spring assembly 74 at both ends, each assembly having 5 parallel disc springs 76. However, any number of disc springs 76 could be used in the disc spring assembly. It is also possible to use no disc spring assemblies, or to have a disc spring assembly at only one end of the spring assembly.

The spring assemblies 50, 80 are described for use in a downhole damping tool, i.e. the ALTFD 10, but the spring assembly can be used for other applications where force dampening is desired.

The spring member 64 is illustrated having a flange member 52, a cup member 54 and an elastomeric member 56. Alternative shapes and members can be used in the spring member 64 to provide a damping effect. At its most basic, the spring member 64 comprises one or more containing members (e.g. flange member and cup member) that retain the elastomeric member and cause deformation of the elastomeric member when the spring member is compressed.

FIG. 19D illustrates an alternative embodiment of the spring member 64. In this case, the spring member 64 comprises an annular disc 58 having a hole 58a in the center. An outer wall 58b extends away from the annular disc around the outer periphery of the annular disc. An inner wall 58c extends in the same direction away from the annular disc around the inner periphery of the annular disc. By stacking two spring members 64 together, as shown in FIG. 19D, a channel 62 is formed for containing the elastomeric member (not shown).

FIG. 19E illustrates another embodiment of the spring member 64. In this case, the inner wall 58c and the outer wall 58b extend from opposite sides of the annular disc, i.e. the inner wall 58c extends from the top surface and the outer wall 58b extends from the bottom surface. Stacking two spring members 64 together creates a channel 62 for containing the elastomeric member (not shown).

Figure 19F:
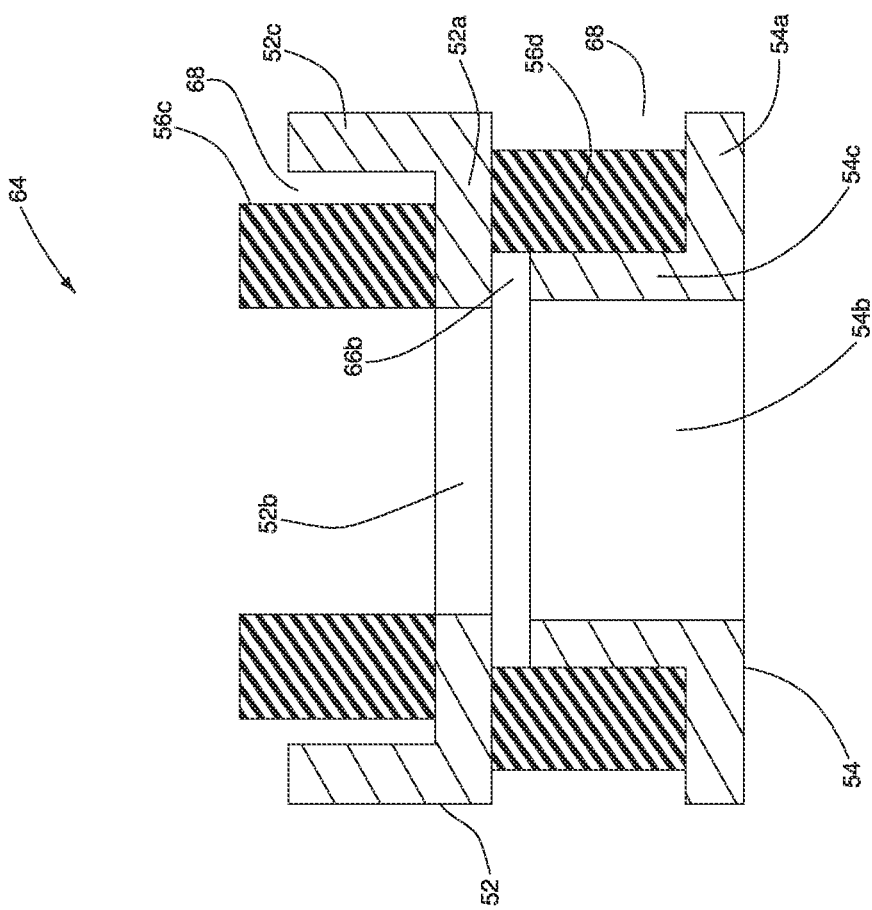

FIG. 19F illustrates a further embodiment of the spring member 64. In this case, the cup member 54, flange member 52 and elastomeric member 56 are the same as the embodiment shown in FIGS. 20A to 22B, except the cup member 52 is flipped to face the opposite direction with respect to the flange member 54. This results in the annular walls 52c, 54c of the flange and cup members extending away from the annular rings 52a, 54a in the same direction instead of opposite directions. There are two elastomeric members 56c,d in this embodiment, with one elastomeric member 56c contained beside the cup member annular wall 52c and one elastomeric member 56d contained beside the flange member annular wall 54c. The elastomeric members 56c,d would not be completely enclosed in the annular channel when the spring member 64 compresses in this embodiment. This, combined with having two elastomeric members 56c,d per spring member 64 results in softer dampening.

Dust Boots/Bellows

Figure 26A:
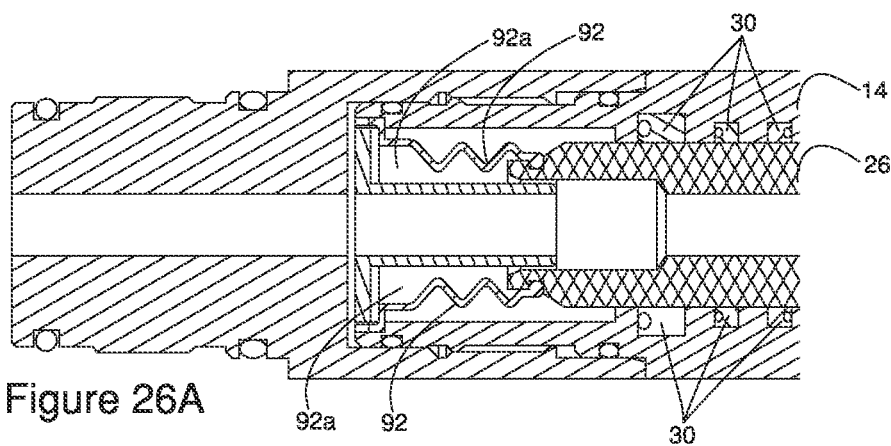
FIGS. 26A and 26B are enlarged cross sectional views of the downhole and uphole ends of the axial and torsional force dampener taken from sections E and F, respectively, in FIG. 16A.
Figure 26B:
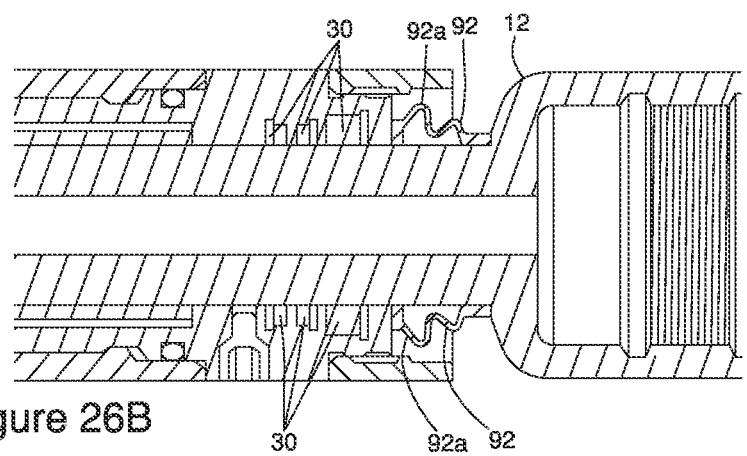

In some embodiments, the ALTFD 10 includes one or more bellows 90, 92, also known as dust boots, to keep drilling mud and other fluids from entering the area of the ALTFD that contains the seals 30, as shown in FIG. 16A. The bellows protects the seals from highly corrosive drilling muds and other fluids and particles that may be encountered during drilling operations. FIGS. 26A and 26B illustrates an enlarged view of the uphole bellows 90 and downhole bellows 92, respectively. The inside of the bellows 90, 92 contains an internal cavity 90a, 92a next to the sealing elements 30. The internal cavity is filled with grease or oil to ensure that only clean fluids contacts the sealing elements, thereby prolonging the life of the seals. The bellows are preferably made of a rubber material such as a fluoroelastomer (e.g. Viton™)

Pressure Compensation

Figure 12:
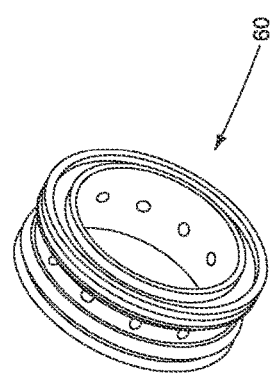
FIG. 12 is a perspective view of a pressure compensation membrane support in accordance with one embodiment of the invention.
Figure 12A:
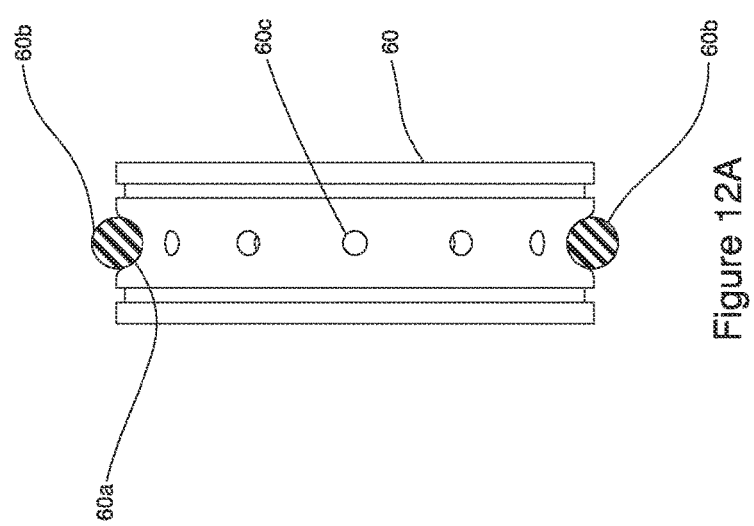
FIG. 12A is a side view of a pressure compensation membrane support in accordance with one embodiment of the invention.

Telescopic compression and extension occurs with both ends of the shaft exposed to the external environment, so that there is always a constant volume of the shaft internally. Thus, as the ALTFD moves, there is no volume change internally and no volume compensation is required. In a preferred embodiment, and as shown in FIGS. 12 and 12A, the pin housing may include a pressure compensation membrane support (PCMS) 60 and o-ring 60b seated against surface 60a. The PCMS 60 and o-ring 60b enable pressure to balance between the interior and exterior of the ALTFD. That is, as shown in FIGS. 1 and 4, the pin housing includes a plurality of holes 18a allowing exterior fluids to enter the pin housing 18 adjacent the PCMS. Exterior fluids pressurize against o-ring 60b which then partially extrudes into holes 60c which then provides an equalizing force to the interior of the ALTFD. Pressure compensation greatly increases seal life and decreases the force the seal exerts on the shaft which allows for freer travel of shaft while also enhancing dampening.

In some embodiments, the pressure compensation support has integral sealing elements, for example an annular ridge 60a (see FIG. 17) on either end of a rubber PCMS 60 which seals the PCMS 60 in the pin sleeve 16 without requiring an o-ring.

Testing

The system was lab tested on simulation apparatus capable of inducing high vibration and shock G-forces to the tool. A first simulation apparatus was capable of inducing 8 G's of vibration and 40 G's of shock to one end of the tool and allowing measurement of vibration and shock loading at the opposite end of the tool. A second simulation device was also utilized that induced 40 G's of vibration and 160 G's of shock.

Testing showed that the tool was capable of reducing the vibration to 0.75 G's and the shock to 4.5 G's from 8 G's of vibration and 40 G's of shock with the first simulation device. With the second simulation device, the ALTFD was able to reduce 40 G's of vibration to 6 G's and 160 g's of shock to 25 g's of shock. These tests were conducted with 4 probes in a horizontal geometry, and over 23 simulations were conducted at timed intervals. During testing, the ATLFD had onboard G measuring and recording devices that enabled data to be downloaded and graphed following each test.

From lab testing, it was also determined that it requires 40 G's of vibration and 160 G's of shock in order to cause the ALTFD to travel to the fully extended or compressed positions. These forces are catastrophic energy levels, and even though the ALTFD is capable of dampening to this level, and attached probes will be protected, generally it is understood that the drillstring and other components external to the probe would likely fail at these energy levels.

Although the present invention has been described and illustrated with respect to preferred embodiments and preferred uses thereof, it is not to be so limited since modifications and changes can be made therein which are within the full, intended scope of the invention as understood by those skilled in the art.

What is claimed is:

1. A spring member for dampening axial forces comprising:
   an elastomeric ring biased in a resting position and elastically deformable to a compressed position;
   a first annular disc having a top surface and a hole in the center;
   second annular disc having a bottom surface and a hole in the center;
   an inner wall extending around an inner perimeter of the second annular disc; and
   an outer wall extending around an outer perimeter of the first annular disc;
   wherein the top surface of the first annular disc faces the bottom surface of the second annular disc and the inner wall of the second annular disc faces the outer wall of the first annular disc to align the holes of each annular disc and form a channel between the annular discs, and the elastomeric ring is disposed in the channel;
   wherein the spring member is movable between:
   a neutral position in which the first and second annular discs are spaced apart to define an outer annular gap between the outer wall and the elastomeric ring, and an inner annular gap between the top surface and the inner wall, such that the inner and outer walls do not contact the annular disc that they are facing;
   a compressed position in which the inner and outer walls abut the annular disc that they are facing;
   wherein movement from the neutral position to the compressed position causes the elastomeric ring to deform into the outer annular gap and to provide force dampening.

2. The spring member of claim 1, wherein:
   the outer wall extends from the first annular disc top surface; and
   the inner wall extends from the second annular disc bottom surface.

3. A spring assembly comprising two or more spring members as defined in claim 1, the two or more spring members stacked together to align the holes of the first and second annular discs of the two or more spring members.

4. The spring assembly of claim 3 further comprising at least one disc spring adjacent the spring member at an end of the spring assembly.

5. A downhole tool for connection to a drill string to dampen forces in equipment housed inside the drill string, the downhole tool comprising the spring assembly of claim 3.

* * * * *